United States Patent
Ozaki et al.

(10) Patent No.: US 9,351,227 B2
(45) Date of Patent: May 24, 2016

(54) WIRELESS COMMUNICATION SYSTEM, WIRELESS COMMUNICATION METHOD, AND TRANSMITTING TERMINAL

(71) Applicant: FUJITSU LIMITED, Kawasaki-shi, Kanagawa (JP)

(72) Inventors: Kazuyuki Ozaki, Yokohama (JP); Yun Wen, Kawasaki (JP); Hiroshi Fujita, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 364 days.

(21) Appl. No.: 14/018,972

(22) Filed: Sep. 5, 2013

(65) Prior Publication Data
US 2014/0140272 A1  May 22, 2014

(30) Foreign Application Priority Data

Nov. 19, 2012 (JP) ................................. 2012-252979

(51) Int. Cl.
*H04W 4/00* (2009.01)
*H04W 40/08* (2009.01)
*H04W 84/18* (2009.01)
*H04W 92/18* (2009.01)

(52) U.S. Cl.
CPC .............. *H04W 40/08* (2013.01); *H04W 84/18* (2013.01); *H04W 92/18* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 7,139,262 B1 * | 11/2006 | Elliott | ........................... | 370/351 |
| 7,171,476 B2 * | 1/2007 | Maeda et al. | .................. | 709/227 |
| 7,177,295 B1 * | 2/2007 | Sholander et al. | ............ | 370/338 |
| 7,319,674 B2 * | 1/2008 | Chandra et al. | ............... | 370/252 |
| 7,532,598 B2 * | 5/2009 | Choi et al. | ..................... | 370/332 |
| 7,561,024 B2 * | 7/2009 | Rudnick | .................. | 340/286.01 |
| 7,804,803 B2 * | 9/2010 | Perumal et al. | ............... | 370/338 |
| 8,036,207 B2 * | 10/2011 | Sivakumar et al. | ........... | 370/351 |
| 8,050,196 B2 * | 11/2011 | Yoon | .............................. | 370/255 |

(Continued)

FOREIGN PATENT DOCUMENTS

| | | |
|---|---|---|
| JP | 2006-005812 | 1/2006 |
| JP | 2006-197483 | 7/2006 |

(Continued)

OTHER PUBLICATIONS

USPTO, [Nguyen] Non-Final Rejection mailed on Oct. 29, 2015 for related U.S. Appl. No. 14/017,997 [pending].

*Primary Examiner* — Steven H Nguyen
(74) *Attorney, Agent, or Firm* — Fujitsu Patent Center

(57) ABSTRACT

A wireless communication system includes a plurality of wireless terminals. Each of transmitting terminals executes direct communication or indirect communication. The wireless communication system includes a first obtainer that obtains a reception side terminal number which is the number of the wireless terminals with which the receiving terminal is able to communicate directly, a second obtainer that obtains a transmission side terminal number which is the number of the wireless terminals with which the transmitting terminal is able to communicate directly for each of a target transmitting terminal and a neighboring transmitting terminal, and a setter that selects one of the direct communication and the indirect communication based on the reception side terminal number, the transmission side terminal number for the target transmitting terminal, and the transmission side terminal number for the neighboring transmitting terminal, and executes the selected communication.

17 Claims, 14 Drawing Sheets

(56) References Cited

U.S. PATENT DOCUMENTS

| | | | |
|---|---|---|---|
| 8,064,377 B2* | 11/2011 | Yi et al. | 370/312 |
| 2002/0145978 A1* | 10/2002 | Batsell et al. | 370/238 |
| 2004/0003111 A1* | 1/2004 | Maeda et al. | 709/237 |
| 2005/0078678 A1* | 4/2005 | Kim et al. | 370/390 |
| 2008/0013502 A1* | 1/2008 | Clark | 370/338 |
| 2008/0317047 A1* | 12/2008 | Zeng et al. | 370/401 |
| 2009/0161578 A1 | 6/2009 | Yeung et al. | |
| 2011/0007669 A1* | 1/2011 | Yoon | 370/255 |

FOREIGN PATENT DOCUMENTS

| | | |
|---|---|---|
| JP | 2007-235828 | 9/2007 |
| JP | 2008-042922 | 2/2008 |
| JP | 2008-085924 | 4/2008 |
| JP | 2008-227854 | 9/2008 |

\* cited by examiner

WIRELESS COMMUNICATION SYSTEM, WIRELESS COMMUNICATION METHOD, AND TRANSMITTING TERMINAL

CROSS-REFERENCE TO RELATED APPLICATION

This application is based upon and claims the benefit of priority of the prior Japanese Patent Application No. 2012-252979, filed on Nov. 19, 2012, the entire contents of which are incorporated herein by reference.

FIELD

The present invention relates to a wireless communication system, a wireless communication method, and a transmitting terminal.

BACKGROUND

Wireless communication systems including a plurality of wireless terminals constituting a wireless ad hoc network have been known. In this type of wireless communication systems, each wireless terminal is mostly configured to perform wireless communication with another wireless terminal according to a Carrier Sense Multiple Access with Collision Avoidance (CSMA/CA) scheme.

In the CSMA/CA scheme, each wireless terminal performs carrier sense before performing communication. The carrier sense is a process of detecting whether or not there is a radio signal transmitted from another wireless terminal through a frequency used to perform wireless communication. Then, each wireless terminal performs wireless communication through the frequency when there is no radio signal transmitted from another wireless terminal. For example, the CSMA/CA scheme is employed in IEEE802.11.

Meanwhile, it is assumed that there are a second wireless terminal and a third wireless terminal which are able to communicate with a first wireless terminal, and the second wireless terminal and the third wireless terminal are unable to communicate with each other. For example, when an obstacle is present between the second wireless terminal and the third wireless terminal, the above-mentioned situation may occur.

In this case, when the third wireless terminal performs the carrier sense while the second wireless terminal is in the process of transmitting a radio signal to the first wireless terminal, it is difficult for the third wireless terminal to detect the presence of the radio signal transmitted from the second wireless terminal. For this reason, the third wireless terminal also starts to transmit a radio signal to the first wireless terminal. As a result, a collision of the radio signals occurs in the first wireless terminal, and the quality of the radio signal received by the first wireless terminal deteriorates.

This problem is referred to as a hidden terminal problem. The hidden terminal problem may cause communication efficiency to degrade. Particularly, in a wireless communication system in which a certain wireless terminal (receiving terminal) receives information from a relatively large number of wireless terminals (transmitting terminals), since a collision of the radio signals frequently occurs in the receiving terminal, the communication efficiency is likely to degrade due to the hidden terminal problem.

In order to solve this problem, first to third techniques have been known (for example, see Japanese Laid-open Patent Publication No. 2008-85924, 2006-5812, 2006-197483, and 2008-227854). The first technique is a technique of determining a communication path based on received signal strength indication (RSSI) of a radio signal transmitted from another wireless terminal.

The second technique is a technique in which each wireless terminal transmits a list of wireless terminals which are able to communicate with its own terminal to a wireless base station, and the wireless base station divides the wireless terminals so that a collision of radio signals does not occur into groups based on the list and performs transmission control for each group. The third technique is a technique in which each wireless terminal obtains a parameter representing a communication quality for each wireless terminal which is able to communicate with its own terminal, and determines a communication path based on the obtained parameter.

Meanwhile, it is assumed that there are a second wireless terminal, a third wireless terminal, and a fourth wireless terminal which are able to communicate with a first wireless terminal, the second wireless terminal is unable to communicate with the third wireless terminal and the fourth wireless terminal, and the third wireless terminal and the fourth wireless terminal are able to communicate with each other.

In this case, among wireless terminals which are able to communicate directly with the first wireless terminal, a hidden terminal number which is the number of wireless terminals which are unable to communicate directly with the second wireless terminal is 2. Meanwhile, among wireless terminals which are able to communicate directly with the first wireless terminal, a hidden terminal number which is the number of wireless terminals which are unable to communicate directly with the third wireless terminal is 1. Thus, the hidden terminal number for the second wireless terminal is different from the hidden terminal number for the third wireless terminal.

However, when the second wireless terminal and the third wireless terminal are located at the same position from the first wireless terminal, the second wireless terminal and the third wireless terminal are the same in the RSSI of a radio signal transmitted from the first wireless terminal. That is, there are cases in which the RSSI does not reflect the hidden terminal number. Thus, when a communication path is determined based on the RSSI, a collision of radio signals is likely to frequently occur in the first wireless terminal (receiving terminal).

Further, when each wireless terminal determines a communication path based on information (for example, an identifier identifying a wireless terminal or a parameter representing a communication quality) of each wireless terminal capable of communicating with its own terminal, a load (for example, a processing load needed to determine a communication path or a communication load needed to communicate the information) is likely to excessively increase.

As described above, in the related arts, there is a problem in that it is difficult to increase communication efficiency without an excessive increase in a load.

SUMMARY

According to an aspect of the embodiments, a wireless communication system includes a plurality of wireless terminals constituting a wireless ad hoc network. The plurality of wireless terminals includes a receiving terminal and a plurality of transmitting terminals. Each of the plurality of transmitting terminals is configured to execute direct communication in which information is transmitted directly to the receiving terminal or indirect communication in which the information is transmitted indirectly to the receiving terminal through at least one other wireless terminal. The wireless communication system includes a reception side terminal number obtainer that obtains a reception side terminal number which is the number of the wireless terminals with which the receiving terminal is able to communicate directly, a transmission side terminal number obtainer that obtains a transmission side terminal number which is the number of the wireless terminals with which the transmitting terminal is able to communicate directly for each of a target transmitting terminal which is one of the plurality of transmitting terminals and a neighboring transmitting terminal which is the transmitting terminal with which the target transmitting terminal is able to communicate directly, and a setter that selects one of the direct communication and the indirect communication based on the reception side terminal number, the transmission side terminal number for the target transmitting terminal, and the transmission side terminal number for the neighboring transmitting terminal, and sets the target transmitting terminal to execute the selected communication.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
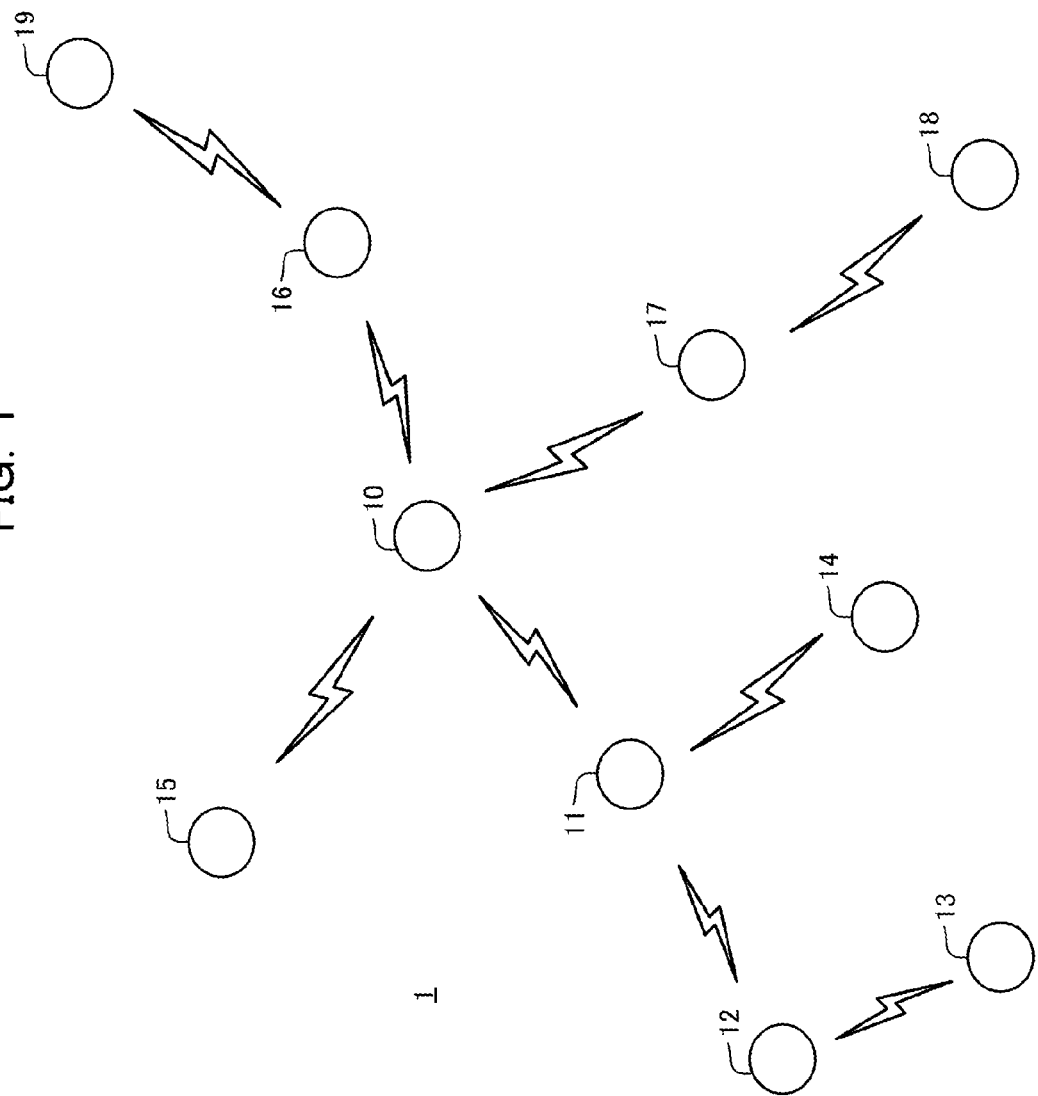
FIG. 1 is a diagram illustrating a configuration of a wireless communication system according to a first embodiment.

Hereinafter, in order to solve at least one of the above-described problems, exemplary embodiments of a wireless communication system, a wireless communication method, a transmitting terminal, a control method, and a control program according to the present invention will be described with reference to FIGS. 1 to 14.

First Embodiment (Outline)

A wireless communication system according to a first embodiment includes a plurality of wireless terminals constituting a wireless ad hoc network. The plurality of wireless terminals includes a receiving terminal and a plurality of transmitting terminals. Each of the plurality of transmitting terminals executes direct communication in which information is transmitted directly to the receiving terminal or indirect communication (non-direct communication) in which information is transmitted to indirectly to the receiving terminal through at least one other transmitting terminal.

The receiving terminal transmits a response request signal. When the response request signal is received, the transmitting terminal transmits a response signal. The receiving terminal receives the response signal, and obtains a reception side terminal number which is the number of transmitting terminals with which the receiving terminal is able to communicate directly. Further, each transmitting terminal receives the response signals transmitted from other transmitting terminals, and obtains a transmission side terminal number which is the number of transmitting terminals with which its own terminal is able to communicate directly.

The receiving terminal transmits the obtained reception side terminal number. Each transmitting terminal calculates the hidden terminal number parameter for its own terminal based on the received reception side terminal number and the obtained transmission side terminal number. The hidden terminal number parameter for its own terminal is a parameter that increases as the hidden terminal number, which is the number of transmitting terminals that are unable to communicate directly with its own terminal among transmitting terminals that are able to communicate directly with the receiving terminal, increases.

Each transmitting terminal transmits the hidden terminal number parameter for its own terminal. Then, each transmitting terminal receives a hidden terminal number parameter for a neighboring transmitting terminal from a neighboring transmitting terminal which is a transmitting terminal that is able to communicate directly with its own terminal.

Each transmitting terminal selects either of the direct communication and the indirect communication based on the hidden terminal number parameter for its own terminal and the hidden terminal number parameter for the neighboring transmitting terminal, and sets its own terminal to executes the selected communication.

Accordingly, it is possible to increase the communication efficiency while avoiding an excessive increase in a load.

Next, the first embodiment will be described in detail.

(Configuration)

As illustrated in FIG. 1, a wireless communication system 1 according to the first embodiment includes a plurality of (10 in this example) wireless terminals (wireless nodes) 10, 11, . . . , and 19. Note that, the wireless communication system 1 may be an arbitrary number of (three or more) wireless terminals.

The wireless communication system 1 constitutes a wireless ad hoc network. In this example, the wireless communication system 1 is configured to perform multi-hop communication. Note that, the wireless communication system 1 may be configured to perform single-hop communication.

Further, in this example, the wireless communication system 1 constitutes a wireless sensor network (WSN).

Note that, the wireless communication system 1 may constitute a wireless ad hoc network other than the wireless sensor network. In this case, physical quantity information which will be described below may be interpreted as information of a transmission target.

Each of the plurality of the wireless terminals 10, 11, ..., and 19 is configured to execute wireless communication with other wireless terminals 10, 11, ..., and 19 located within a range (for example, a range in which strength (received field strength) of a received radio signal is equal to or more than a predetermined (given) reference value) in which a radio signal can be transmitted or received.

In this example, the wireless terminal 10 is an example of the receiving terminal and also referred to as a receiving terminal. Each of the wireless terminals 11, 12, ..., and 19 is an example of the transmitting terminal and also referred to as a transmitting terminal. Note that, the wireless communication system 1 may include a plurality of receiving terminals.

Each of the transmitting terminals 11, 12, ..., and 19 is configured to execute direct communication or indirect communication. In this example, the direct communication refers to communication in which information is transmitted directly to the receiving terminal 10. In this example, the indirect communication refers to communication in which information is transmitted indirectly to the receiving terminal 10 through at least one of the other transmitting terminals 11, 12, ..., and 19.

for example, as illustrated in FIG. 1, a communication path may be set between each of the transmitting terminals 11, 12, ..., and 19 and the receiving terminal 10.

Each of the transmitting terminals 11, 15, 16, and 17 performs communication with the receiving terminal 10 by performing single-hop communication in which the hop number is 1. In other words, each of the transmitting terminals 11, 15, 16, and 17 performs the direct communication with the receiving terminal 10.

Further, each of the transmitting terminals 12 and 14 performs communication with the receiving terminal 10 through the transmitting terminal 11. In other words, each of the transmitting terminals 12 and 14 performs communication with the receiving terminal 10 by performing multi-hop communication in which the hop number is 2.

Similarly, the transmitting terminal 18 performs communication with the receiving terminal 10 through the transmitting terminal 17. In other words, the transmitting terminal 18 performs communication with the receiving terminal 10 by performing multi-hop communication in which the hop number is 2. Similarly, the transmitting terminal 19 performs communication with the receiving terminal 10 through the transmitting terminal 16. In other words, the transmitting terminal 19 performs communication with the receiving terminal 10 by performing multi-hop communication in which the hop number is 2.

Further, the transmitting terminal 13 performs communication with the receiving terminal 10 while passing through the transmitting terminal 12 and the transmitting terminal 11 in order. In other words, the transmitting terminal 13 performs communication with the receiving terminal 10 by performing multi-hop communication in which the hop number is 3.

In other words, each of the transmitting terminals 12, 13, 14, 18, and 19 performs the indirect communication with the receiving terminal 10.

The receiving terminal 10 is connected to perform communication with an information processing apparatus (not illustrated) via a communication network (not illustrated). The receiving terminal 10 receives information transmitted from each of the transmitting terminals 11, 12, ..., and 19, and transmits the received information and information generated by its own terminal to the information processing apparatus. In this example, the receiving terminal 10 functions as a gateway device.

Figure 2:
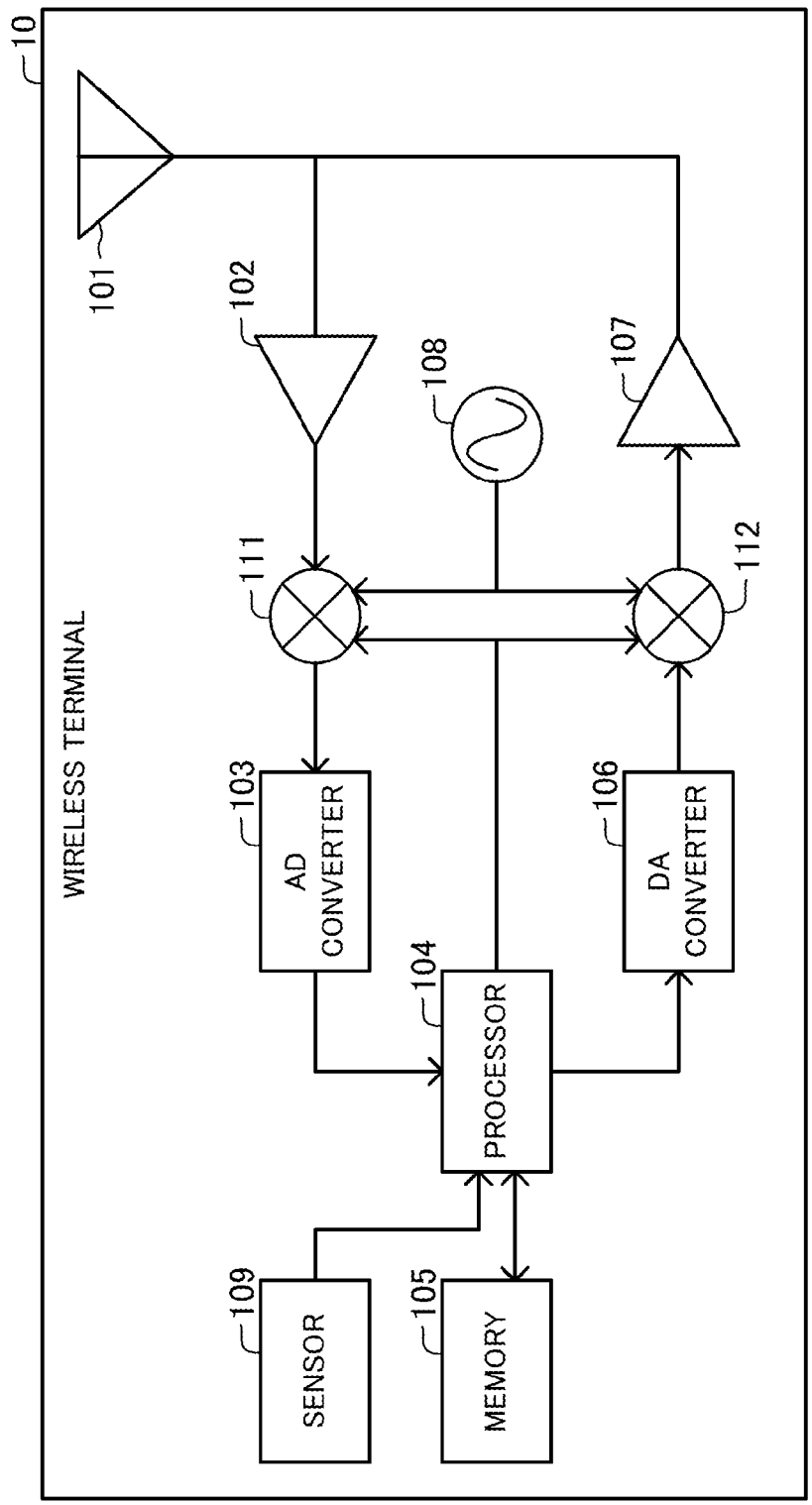
FIG. 2 is a diagram illustrating a configuration of a wireless terminal according to the first embodiment.

As illustrated in FIG. 2, the receiving terminal 10 includes an antenna 101, a first amplifier 102, an analog-to-digital (AD) converter 103, a processor 104, a memory 105, a digital-to-analog (DA) converter 106, a second amplifier 107, an oscillator 108, a sensor 109, a down converter 111, and an up converter 112.

The antenna 101 transmits an electrical signal to the external space as a radio signal (radio wave), and receives a radio signal of the external space as an electrical signal. The first amplifier 102 amplifies a signal (radio frequency (RF)) received by the antenna 101.

The oscillator 108 generates an alternating current (AC) signal of a continuous wave. The down converter 111 converts the RF signal into a baseband signal by converting a frequency of an RF signal using the AC signal generated by the oscillator 108. The AD converter 103 converts the baseband signal from an analog signal into a digital signal, and outputs the converted baseband signal.

The memory 105 stores a program executed by the processor 104 and data used by the processor 104 when the program is executed, and stores information in a readable/writable manner.

The processor 104 executes the program stored in the memory 105, processes the baseband signal output from the AD converter 103 and a baseband signal including physical quantity information output from the sensor 109 which will be described later, and outputs a baseband signal as a processing result. For example, the receiving terminal 10 implements functions which will be described later. Among functions which will be described later, a function of storing information is implemented by the memory 105.

The DA converter 106 converts the baseband signal output from the processor 104 from a digital signal into an analog signal. The up converter 112 converts the baseband signal into the RF signal by converting a frequency of the baseband signal using the AC signal generated by the oscillator 108.

The second amplifier 107 amplifies the RF signal so that transmission power of the RF signal matches a transmission power value set by the processor 104. The antenna 101 transmits the RF signal amplified by the second amplifier 107 to the external space as the radio signal.

The sensor 109 measures a physical quantity (for example, a temperature, humidity, acceleration, illumination, a wind direction, a wind velocity, seismic motion, rainfall, loudness, a water level, an amount of used electric power, an amount of used water, or an amount of used gas), and outputs a baseband signal including physical quantity information representing the measured physical quantity to the processor 104. In this example, the sensor 109 measures the physical quantity each time a certain measurement period of time elapses. Note that, the sensor 109 may be configured to measure the physical quantity each time the receiving terminal 10 receives a certain measurement request.

Note that, each of the transmitting terminals 11, 12, ..., and 19 has the same configuration as the receiving terminal 10.

(Function)

Figure 3:
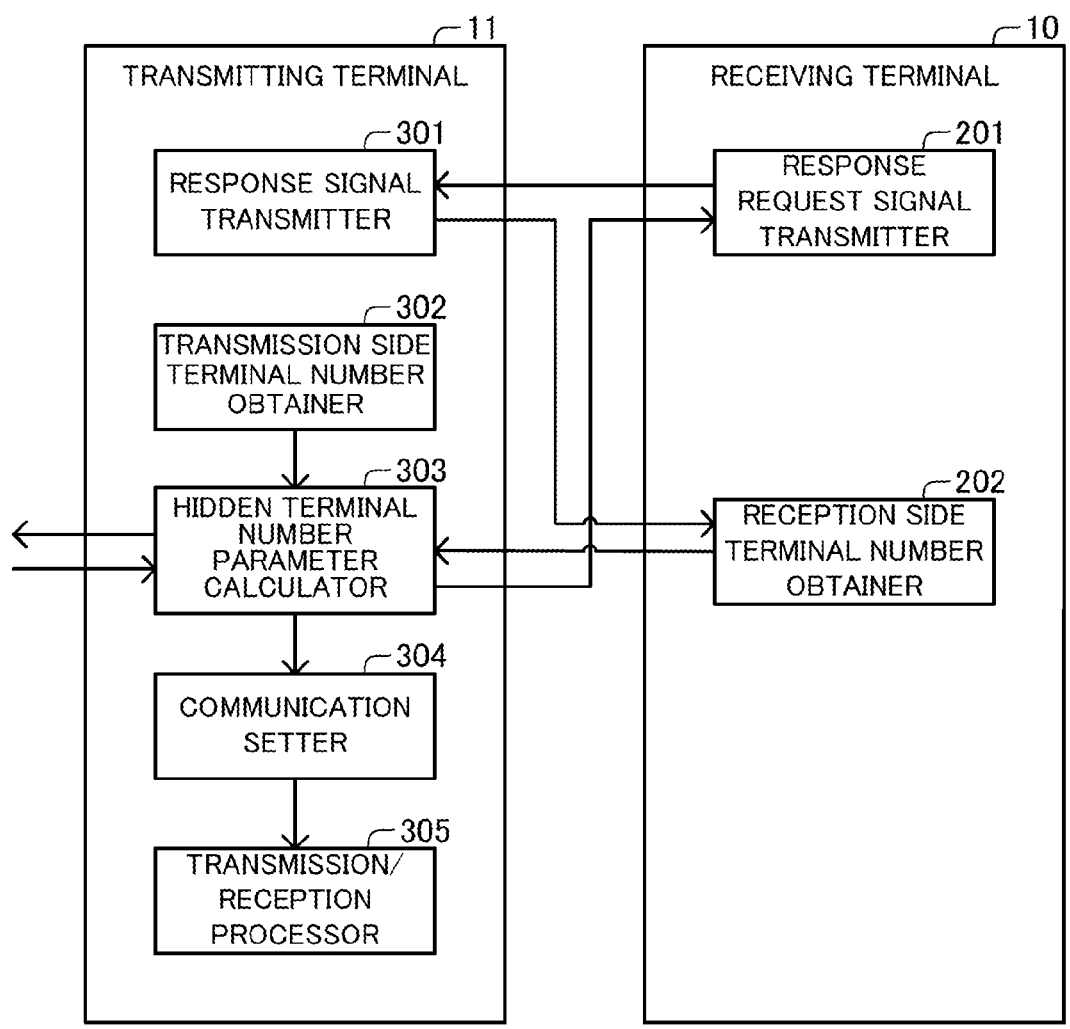
FIG. 3 is a diagram illustrating functions of a transmitting terminal and a receiving terminal according to the first embodiment.

As illustrated in FIG. 3, functions of the receiving terminal 10 include a response request signal transmitter 201 and a reception side terminal number obtainer 202.

Further, functions of the transmitting terminal 11 include a response signal transmitter 301, a transmission side terminal number obtainer 302, a hidden terminal number parameter calculator (a first receiver, a second receiver, and a transmitter) 303, a communication setter 304, and a transmission/reception processor 305. The hidden terminal number parameter calculator 303 and the communication setter 304 constitute an example of a setter. Note that, each of the transmitting terminals 12, 13, . . . , and 19 other than the transmitting terminal 11 has a function similar to the function of the transmitting terminal 11.

The response request signal transmitter 201 of the receiving terminal 10 transmits a certain response request signal. In this example, the response request signal is a signal (that is, a broadcast signal) whose destination is set to all wireless terminals. As will be described later, when the response request signal is received, each of the transmitting terminals 11, 12, . . . , and 19 does not transfer the response request signal to the other wireless terminals 10, 11, . . . , and 19.

The response signal transmitter 301 of the transmitting terminal 11 receives the response request signal transmitted by the receiving terminal 10. When the response request signal is received, the response signal transmitter 301 transmits a certain response signal. In this example, the response signal is also a broadcast signal. As will be described later, when the response signal is received, each of the wireless terminal 10, 11, . . . , and 19 does not transfer the response signal to the other wireless terminals 10, 11, . . . , and 19.

The reception side terminal number obtainer 202 of the receiving terminal 10 receives the response signals transmitted from the transmitting terminals 11, 12, . . . , and 19. The reception side terminal number obtainer 202 obtains a reception side terminal number which is the number of wireless terminal (that is, the transmitting terminals 11, 12, . . . , and 19) with which the receiving terminal 10 is able to communicate directly. In this example, the reception side terminal number obtainer 202 obtains the reception side terminal number based on the received response signals. For example, the reception side terminal number obtainer 202 obtains the number of response signals received within a period of time until a certain first standby period of time elapses since the response request signal is transmitted as the reception side terminal number.

The reception side terminal number obtainer 202 transmits a reception side terminal number signal representing the obtained reception side terminal number. In this example, the reception side terminal number signal is also a broadcast signal. As will be described later, when the reception side terminal number signal is received, each of the transmitting terminals 11, 12, . . . , and 19 does not transfer the reception side terminal number signal to the other wireless terminals 10, 11, . . . , and 19.

The transmission side terminal number obtainer 302 of the transmitting terminal 11 receives the response signal transmitted from the other transmitting terminals 12, 13, . . . , and 19. When its own terminal 11 is set to execute the direct communication (that is, when its own terminal 11 is a direct transmitting terminal), the transmission side terminal number obtainer 302 obtains a transmission side terminal number which is the number of wireless terminals (in this example, the transmitting terminals 12, 13, . . . , and 19) with which its own terminal (a target transmitting terminal, and here, the transmitting terminal 11) is able to communicate directly.

In this example, the transmission side terminal number obtainer 302 obtains the transmission side terminal number based on the received response signals. For example, the transmission side terminal number obtainer 302 obtains the number of response signals received within a period of time until a certain second standby period of time elapses since the response request signal is received as the transmission side terminal number.

The hidden terminal number parameter calculator 303 of the transmitting terminal 11 receives the reception side terminal number signal transmitted from the receiving terminal 10. When its own terminal 11 is the direct transmitting terminal, the hidden terminal number parameter calculator 303 calculates a hidden terminal number parameter for its own terminal 11 based on the reception side terminal number represented by the received reception side terminal number signal and the transmission side terminal number obtained by the transmission side terminal number obtainer 302.

Here, the hidden terminal number parameter is a value that increases as the hidden terminal number, which is the number of the transmitting terminals 12, 13, . . . , and 19 that are unable to communicate directly with its terminal of interest among the transmitting terminals 12, 13, . . . , and 19 that are able to communicate directly with the receiving terminal 10, increases. The hidden terminal number parameter for its own terminal 11 is the hidden terminal number parameter in which a terminal of interest is its own terminal (a target transmitting terminal, and here, the transmitting terminal 11).

In this example, the hidden terminal number parameter is a value obtained by subtracting a value obtained by adding "1" to the transmission side terminal number from the reception side terminal number. Note that, the hidden terminal number parameter may be a value obtained by dividing a value obtained by subtracting a value obtained by adding "1" to the transmission side terminal number from the reception side terminal number by the reception side terminal number.

When its own terminal 11 is the direct transmitting terminal, the hidden terminal number parameter calculator 303 transmits a parameter signal representing the calculated hidden terminal number parameter. In this example, the parameter signal is also a broadcast signal. As will be described later, when the parameter signal is received, each of the wireless terminals 10, 11, . . . , and 19 does not transfer the parameter signal to the other wireless terminals 10, 11, . . . , and 19.

The hidden terminal number parameter calculator 303 receives parameter signals transmitted from the transmitting terminals 12, 13, . . . , and 19 (that is, the neighboring transmitting terminal) that are able to communicate directly with its own terminal 11. In other words, the parameter signal represents the hidden terminal number parameter for the neighboring transmitting terminal. The hidden terminal number parameter for the neighboring transmitting terminal is a hidden terminal number parameter in which a terminal of interest is a neighboring transmitting terminal.

Further, the response request signal transmitter 201 of the receiving terminal 10 receives parameter signals transmitted from the transmitting terminals 11, 12, . . . , and 19 (in this example, the direct transmitting terminal). The response request signal transmitter 201 transmits the response request signal again when the maximum value of the hidden terminal number parameters (that is, the hidden terminal number parameters of the direct transmitting terminals) represented by the received parameter signals is equal to or greater than a certain first target value. For example, the first target value is the upper limit value of the hidden terminal number allowed for the wireless communication system 1.

When its own terminal 11 is the direct transmitting terminal, the communication setter 304 of the transmitting terminal 11 executes a communication selection process, a path setting process, and a transmission power setting process. Note that, execution of the path setting process and the transmission power setting process is an example of communication setting. Meanwhile, the communication setter 304 may be configured not to execute the transmission power setting process.

The communication selection process is a process of selecting either the direct communication, or the indirect communication for its own terminal 11.

In this example, in the communication selection process, either of the direct communication and the indirect communication is selected for its own terminal 11 based on the calculated hidden terminal number parameter (that is, this parameter is for its own terminal 11) and the hidden terminal number parameter (that is, this parameter is for each neighboring transmitting terminal) represented by the received parameter signal.

For example, in the communication selection process, when the hidden terminal number parameter for its own terminal 11 is equal to or greater than a certain first threshold value and the hidden terminal number parameter for its own terminal 11 is larger than the maximum value of the hidden terminal number parameters for the neighboring transmitting terminals, the indirect communication is selected. In this example, the first threshold value is the same value as the first target value. Note that, the first threshold value may be changed within the range of equal to or more than the first target value.

Meanwhile, in the communication selection process, when the hidden terminal number parameter for its own terminal 11 is smaller than the first threshold value or when the hidden terminal number parameter for its own terminal 11 is equal to or smaller than the maximum value of the hidden terminal number parameters for the neighboring transmitting terminals, the direct communication is selected.

As described above, in the communication selection process, either of the direct communication and the indirect communication is selected based on the reception side terminal number, the transmission side terminal number for its own terminal 11, and the transmission side terminal numbers for the neighboring transmitting terminals.

The path setting process is a process of setting a path used to transmit physical quantity information from each of the transmitting terminals 11, 12, . . . , and 19 to the receiving terminal 10.

In the path setting process, when the direct communication is selected in the communication selection process, a path (direct path) connecting its own terminal 11 directly with the receiving terminal 10 is set as a path used for its own terminal 11 to transmit the physical quantity information. Meanwhile, in the path setting process, when the indirect communication is selected in the communication selection process, a path (indirect path) connecting its own terminal 11 indirectly with the receiving terminal 10 through at least one other transmitting terminals 12, 13, . . . , and 19 is set as a path used for its own terminal 11 to transmit the physical quantity information.

As described above, the path setting process can be referred to as a process of setting its own terminal 11 to execute the selected communication (that is, the direct communication or the indirect communication).

In this example, in the path setting process, when the indirect path is set, an indirect path setting request including a terminal identifier identifying its own terminal 11 is transmitted. Here, in the path setting process, when there are a plurality of candidates (the transmitting terminals 12, 13, . . . , and 19) as a transmission destination of the indirect path setting request, one of the candidates is selected as the transmission destination based on strength (received field strength) of radio signals received from the candidates. Note that, in the path setting process, the transmission destination may be randomly selected from among the candidates.

Further, in the path setting process, when the indirect communication is selected for its own terminal 11 and the indirect path setting requests are received from the other transmitting terminals 12, 13, . . . , and 19, a terminal identifier identifying its own terminal 11 is added to the received indirect path setting request. Then, in the path setting process, the indirect path setting request including the terminal identifier is transmitted.

In the path setting process, when the direct communication is selected for its own terminal 11 and the indirect path setting requests are received from the other transmitting terminals 12, 13, . . . , and 19, a setting completion notification is generated based on information included in the indirect path setting request. In the path setting process, the setting completion notification is transmitted such that the generated setting completion notification is transmitted in a direction opposite to a transmission direction of the indirect path setting request through a path through which the indirect path setting request is transmitted.

The setting completion notification includes path information. The path information is information representing a path through which the indirect path setting request is transmitted. For example, the path information includes a terminal identifier identifying the wireless terminals 10, 11, . . . , and 19 constituting a path and information representing an order in which the wireless terminals 10, 11, . . . , and 19 are lined up in the path.

Further, in the path setting process, when the setting completion notification is received, the path information included in the setting completion notification is held. As described above, the indirect path is set.

Note that, the process of setting the indirect path may be a process according to another method.

The transmission power setting process is a process of setting transmission power (transmission power of a radio signal) used for its own terminal 11 to transmit a signal including the physical quantity information. In the transmission power setting process, when the direct communication is selected in the communication selection process, certain first transmission power is set as the transmission power. In this example, first transmission power is power in which strength (received field strength) of the radio signal received by the receiving terminal 10 is determined to be larger than a certain reference value. Note that, the first transmission power may be power that differ according to each of the transmitting terminals 11, 12, . . . , and 19.

In the transmission power setting process, when the indirect communication is selected in the communication selection process, second transmission power smaller than the first transmission power is set as the transmission power. In this example, in the transmission power setting process, power determined such that reception power (for example, received field strength corresponding to reception power) of a radio signal received by the receiving terminal 10 is smaller than a value that is set as a lower limit of a communicable range in advance is used as the second transmission power. Thus, the occurrence of a collision of radio signals in the receiving terminal 10 can be more reliably suppressed.

For example, the transmission power setting process determines second transmission power $P_{tx}$ based on the following Expression 1:

$$P_{tx} = P_{min} + L_{GW} - \alpha \qquad \text{[Expression 1]}$$

Here, $P_{min}$ represents a minimum reception power. The minimum reception power $P_{min}$ is a value which the receiving terminal 10 sets as a lower limit of reception power of a radio signal in the receiving terminal 10 within a communicable range in advance. In this example, the minimum reception power $P_{min}$ for each of the transmitting terminals 11, 12, ..., and 19 is also set to the same value as the minimum reception power $P_{min}$ for the receiving terminal 10. Note that, the minimum reception power $P_{min}$ may be set to a different value for each of the wireless terminals 10, 11, ..., and 19.

Further, $L_{GW}$ represents propagation loss between its own terminal 11 and the receiving terminal 10. The propagation loss is power lost with the propagation of a radio signal. Further, α is certain first surplus power including a positive value.

The transmission power setting process calculates the propagation loss $L_{GW}$ between its own terminal 11 and the receiving terminal 10 based on the following Expression 2:

$$L_{GW}=P_{tx\_GW}-P_{rx\_GW} \quad \text{[Expression 2]}$$

Here, $P_{tx\_GW}$ is transmission power of a radio signal to be transmitted by the receiving terminal 10 in the receiving terminal 10. $P_{rx\_GW}$ is reception power of a radio signal transmitted by the receiving terminal 10 in its own terminal 11. In this example, notification of the transmission power $P_{tx\_GW}$ in the receiving terminal 10 is given from the receiving terminal 10 to each of the transmitting terminals 11, 12, ..., and 19. Thus, in the transmission power setting process, a value notified from the receiving terminal 10 is obtained as the transmission power $P_{tx\_GW}$ in the receiving terminal 10. Further, in the transmission power setting process, reception power of the response request signal received by its own terminal 11 is obtained as the reception power $P_{rx\_GW}$ in its own terminal 11.

Note that, the second transmission power may be power which is smaller than the first transmission power by a certain amount of power change.

The transmission/reception processor 305 of the transmitting terminal 11 executes a transmission process and a transfer process.

The transmission process is a process of transmitting the physical quantity information measured by its own terminal 11 to the receiving terminal 10. The transfer process is a process of transmitting (that is, transferring) the physical quantity information received from the other transmitting terminals 12, 13, ..., and 19 (that is, excluding its own terminal 11) to the receiving terminal 10.

Note that, in both the transmission process and the transfer process, the transmission/reception processor 305 specifies a transmission destination of the physical quantity information according to a path (that is, a path represented by the held path information) set through the path setting process. Then, the transmission/reception processor 305 transmits the signal in which the specified transmission destination is set as the destination and which includes the physical quantity information with transmission power set through the transmission power setting process.

Meanwhile, the transmission/reception processor 305 may be configured to transmit information including the physical quantity information measured by its own terminal 11 and physical quantity information received from the other transmitting terminals 12, 13, ..., and 19.

Further, when the response request signal, the response signal, the reception side terminal number signal, and the parameter signal are received, the transmission/reception processor 305 does not transfer the signals.

In this example, the transmission/reception processor 305 executes the transmission process and the transfer process according to the CSMA/CA scheme. In other words, when at least one of the transmission process and the transfer process is executed, the transmission/reception processor 305 executes the carrier sense before transmission of a radio signal.

The carrier sense is a process of detecting whether or not there are radio signals transmitted from the other wireless terminals 10, 11, ..., and 19 at a frequency (a frequency of a carrier wave) of a radio signal. For example, in the carrier sense, when strength (received field strength) of a radio signal received at a frequency of a radio signal is larger than a certain presence threshold value, it is detected that there are radio signals transmitted from the other wireless terminals 10, 11, ..., and 19.

When it is detected in the carrier sense that there are radio signals transmitted from the other wireless terminals 10, 11, ..., and 19, the transmission/reception processor 305 suspends transmission of a radio signal from its own terminal, and then executes the carrier sense again after a certain third standby period of time elapses. When it is detected in the carrier sense that there is no radio signal transmitted from any of the other wireless terminals 10, 11, ..., and 19, the transmission/reception processor 305 performs transmission of a radio signal from its own terminal.

(Operation)

Next, an operation of the wireless communication system 1 will be described with reference to FIGS. 4 and 5.

In this example, each of the transmitting terminals 11, 12, ..., and 19 is arranged at the position at which each transmitting terminal can perform wireless communication directly with the receiving terminal 10. In other words, each of the transmitting terminals 11, 12, ..., and 19 is arranged at the position at which the direct communication can be executed. Note that, the wireless communication system 1 may include another transmitting terminal which is arranged at the position at which the transmitting terminal is not able to perform wireless communication directly with the receiving terminal 10.

Further, in this example, each of the transmitting terminals 11, 12, ..., and 19 is set to execute the direct communication in the initial status. Thus, in the initial status, each of the transmitting terminals 11, 12, ..., and 19 sets certain first transmission power as transmission power (transmission power of a radio signal) used for its own terminal to transmit the signal including the physical quantity information.

Figure 4:
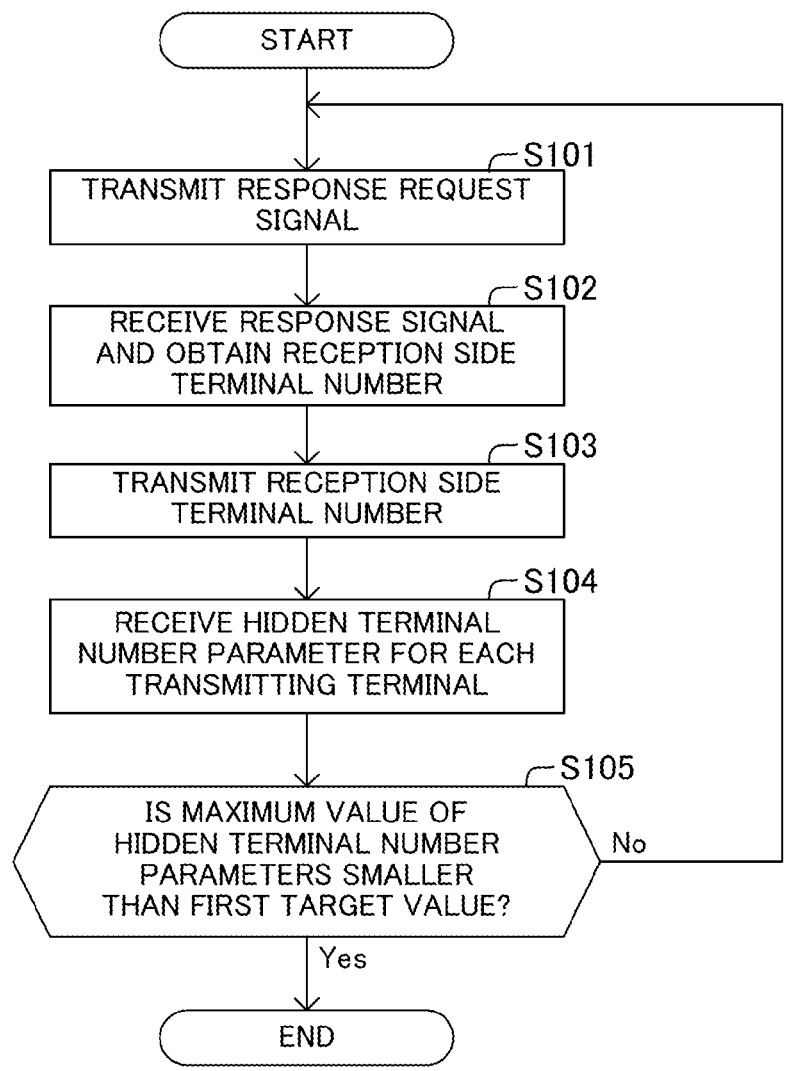
FIG. 4 is a flowchart illustrating a process executed by the receiving terminal according to the first embodiment.

The receiving terminal 10 is configured to execute the process represented by the flowchart of FIG. 4 at a certain timing after the receiving terminal 10 is activated. Note that, alternatively, the receiving terminal 10 may execute the process according to an input of an instruction from the user or reception of an instruction from information processing apparatus. Further, the receiving terminal 10 may execute the process each time when a certain execution period of time elapses.

Figure 5:
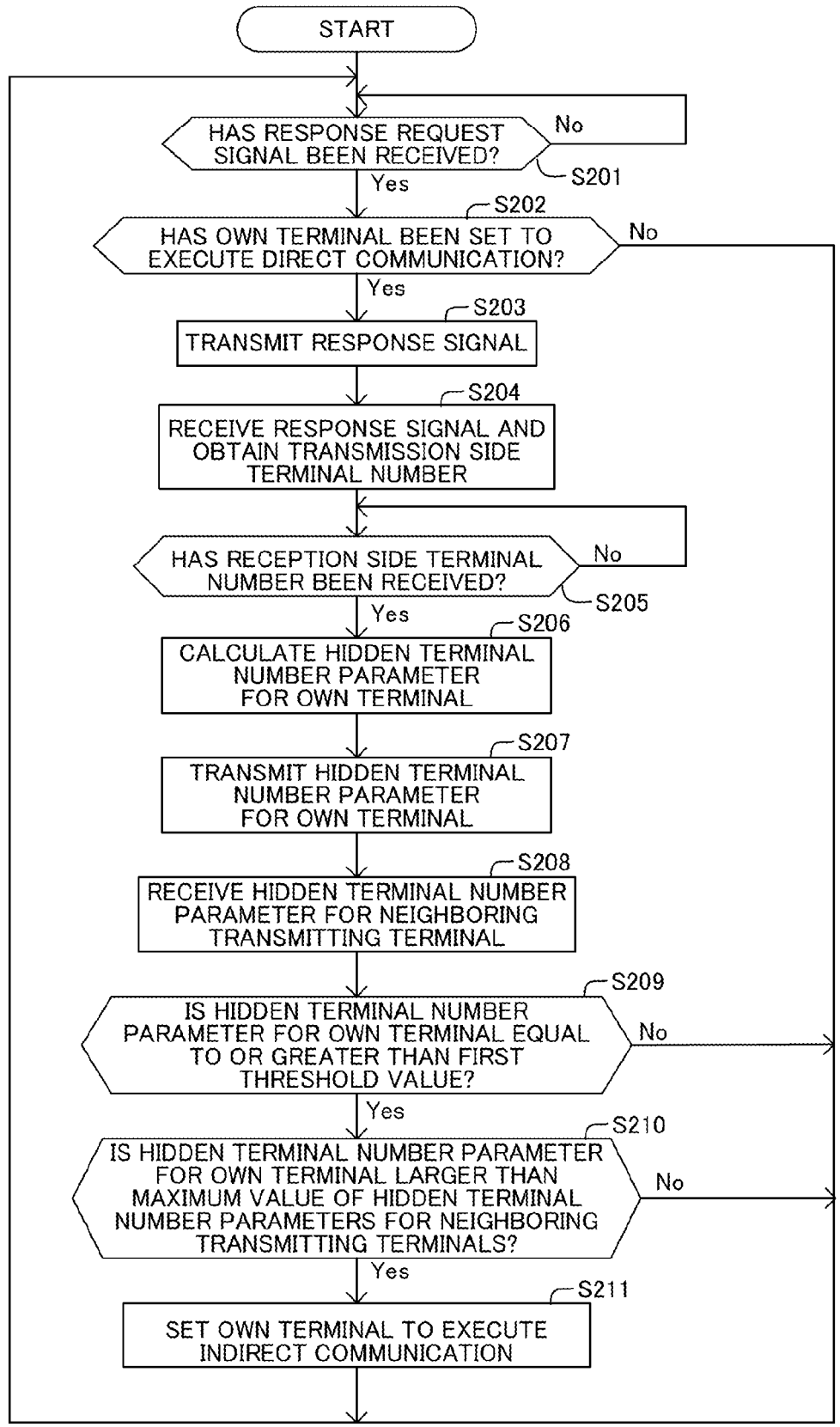
FIG. 5 is a flowchart illustrating a process executed by the transmitting terminal according to the first embodiment.

Meanwhile, the transmitting terminal 11 is configured to execute a process represented by a flowchart of FIG. 5 at a certain timing after the transmitting terminal 11 is activated. Note that, each of the transmitting terminals 12, 13, ..., and 19 other than the transmitting terminal 11 operates similarly to the transmitting terminal 11. Operations of the transmitting terminals 11, 12, ..., and 19 will be described below focusing on an operation of the transmitting terminal 11.

First of all, the receiving terminal 10 transmits a response request signal (step S101 of FIG. 4).

Meanwhile, the transmitting terminal 11 is on standby until the response request signal is received (step S201 of FIG. 5). Then, when the response request signal is received, the transmitting terminal 11 determines "Yes," and determines whether or not its own terminal 11 has been set to execute the direct communication (step S202 of FIG. 5).

According to the above assumption, at this point in time, the transmitting terminal 11 remains set to execute the direct communication. Thus, the transmitting terminal 11 determines "Yes," and transmits a response signal (step S203 of FIG. 5).

Meanwhile, the receiving terminal 10 obtains the number of the response signals received within a period of time until a certain first standby period of time elapses after the response request signal is transmitted in step S101 of FIG. 4 as the reception side terminal number (step S102 of FIG. 4). According to the above assumption, at this point in time, the receiving terminal 10 obtains "9" as the reception side terminal number. Then, the receiving terminal 10 transmits the reception side terminal number signal representing the obtained reception side terminal number (step S103 of FIG. 4).

Meanwhile, the transmitting terminal 11 obtains the number of the response signals received within a period of time until a certain second standby period of time elapses after the response request signal is received in step S201 of FIG. 5 as the transmission side terminal number (step S204 of FIG. 5). In other words, the transmitting terminal 11 obtains the transmission side terminal number which is the number of transmitting terminals (in this example, the transmitting terminals 12, 13, . . . , and 19) with which its own terminal 11 is able to communicate directly. Here, an example in which the transmitting terminal 11 obtains "2" as the transmission side terminal number is assumed.

Next, the transmitting terminal 11 is on standby until the reception side terminal number signal is received (step S205 of FIG. 5). Then, when the reception side terminal number signal transmitted from the receiving terminal 10 is received, the transmitting terminal 11 determines "Yes," and calculates the hidden terminal number parameter for its own terminal 11 (step S206 of FIG. 5).

In this example, the transmitting terminal 11 calculates a value obtained by subtracting a value obtained by adding "1" to the obtained transmission side terminal number from the reception side terminal number represented by the received reception side terminal number signal as the hidden terminal number parameter. According to the above assumption, the transmitting terminal 11 calculates "6 (=9−2−1)" as the hidden terminal number parameter. Then, the transmitting terminal 11 transmits a parameter signal representing the calculated hidden terminal number parameter (step S207 of FIG. 5).

Meanwhile, the receiving terminal 10 receives the parameter signals transmitted from the transmitting terminals 11, 12, . . . , and 19 (step S104 of FIG. 4). Then, the receiving terminal 10 determines whether or not a maximum value of the hidden terminal number parameters (that is, the hidden terminal number parameters for the direct transmitting terminals 11, 12, . . . , and 19) represented by the received parameter signals is smaller than a certain first target value (step S105 of FIG. 4).

In this example, the maximum value of the hidden terminal number parameter is assumed to be "6," and the first target value is assumed to be "3." Thus, the receiving terminal 10 determines "No," is on standby during a certain transmission standby period of time, causes the process to return to step S101, and then repeatedly executes the process of steps S101 to S105.

Meanwhile, the transmitting terminal 11 receives the parameter signals transmitted from the other transmitting terminals 12, 13, . . . , 19 (the neighboring transmitting terminals) that are able to communicate directly with its own terminal 11 within a period of time until a certain fourth standby period of time elapses after the parameter signal is transmitted (step S208 of FIG. 5).

Next, the transmitting terminal 11 determines whether or not the hidden terminal number parameter for its own terminal 11 is equal to or greater than a certain first threshold value (step S209 of FIG. 5). In this example, the first threshold value is assumed to be set to "3" which is the same value as the first target value.

Thus, the transmitting terminal 11 determines "Yes," and determines whether or not the hidden terminal number parameter for its own terminal 11 is larger than the maximum value of the hidden terminal number parameters for the neighboring transmitting terminals 12, 13, . . . , and 19 (step S210 of FIG. 5).

In this example, the hidden terminal number parameter for its own terminal 11 is assumed to be larger than the maximum value of the hidden terminal number parameters for the neighboring transmitting terminals 12, 13, . . . , and 19. Thus, the transmitting terminal 11 determines "Yes," and sets its own terminal 11 to execute the indirect communication (step S211 of FIG. 5).

For example, the transmitting terminal 11 sets a path (an indirect path) connecting its own terminal 11 indirectly with the receiving terminal 10 through at least one of the other transmitting terminals 12, 13, . . . , and 19 as a path used for its own terminal 11 to transmit the physical quantity information.

Further, the transmitting terminal 11 sets second transmission power smaller than the first transmission power by a certain amount of change in power as transmission power (transmission power of a radio signal) used for its own terminal 11 to transmit the signal including the physical quantity information.

Thereafter, the transmitting terminal 11 causes the process to return to step S201, and the process of steps S201 to S211 is repetitively executed.

Then, when the response request signal is received again, the transmitting terminal 11 determines "No" in step S202 of FIG. 5, and causes the process to return to step S201. In other words, the process of steps S203 to S211 of FIG. 5 can be referred to as a process executed only by the transmitting terminal (in other words, the direct transmitting terminal) set to execute the direct communication among the transmitting terminals 11, 12, . . . , and 19.

Note that, when the transmitting terminal 11 proceeds to step S209 of FIG. 5 and the hidden terminal number parameter for its own terminal 11 is smaller than the first threshold value, the transmitting terminal 11 determines "No," and causes the process to return to step S201 without executing the process of step S211. In other words, in this case, the transmitting terminal 11 maintains the state in which its own terminal 11 is set to execute the direct communication.

Further, when the transmitting terminal 11 proceeds to step S210 of FIG. 5, the hidden terminal number parameter for its own terminal 11 is assumed to be equal to or smaller than the maximum value of the hidden terminal number parameter for the neighboring transmitting terminals 12, 13, . . . , and 19. In this case, the transmitting terminal 11 determines "No" in step S210, and causes the process to return to step S201 without executing the process of step S211. In other words, in this case, the transmitting terminal 11 maintains the state in which its own terminal 11 is set to execute the direct communication.

Meanwhile, the receiving terminal 10 repetitively executes the process of steps S101 to S105 of FIG. 4 until the maximum value of the hidden terminal number parameters for the direct transmitting terminals 11, 12, . . . , and 19 is smaller than the first target value.

Thereafter, as the number of transmitting terminals (indirect transmitting terminals) set to execute the indirect communication among the transmitting terminals 11, 12, . . . , and 19 increases, the maximum value of the hidden terminal number parameters for the direct transmitting terminals 11, 12, . . . , and 19 decreases. Then, when the maximum value of the hidden terminal number parameters for the direct transmitting terminals 11, 12, . . . , and 19 is smaller than the first target value, the receiving terminal 10 determines "Yes" when the process proceeds to step S105 of FIG. 4, and then the process illustrated in FIG. 4 ends.

As described above, the wireless communication system 1 according to the first embodiment obtains the reception side terminal number. Further, the wireless communication system 1 obtains the transmission side terminal numbers for a plurality of the transmitting terminals 11, 12, . . . , and 19 (target transmitting terminals) and the transmission side terminal numbers for the neighboring transmitting terminals which are the transmitting terminals 11, 12, . . . , and 19 that are able to communicate directly with the target transmitting terminal. In addition, the wireless communication system 1 selects either of the direct communication and the indirect communication based on the reception side terminal number, the transmission side terminal number for the target transmitting terminal, and the transmission side terminal number for the neighboring transmitting terminal, and sets the target transmitting terminal to execute the selected communication.

Meanwhile, the reception side terminal number and the transmission side terminal number exactly reflect the hidden terminal number. Thus, according to the above configuration, the occurrence of a collision of radio signals in the receiving terminal 10 can be suppressed. Further, the amount of information including the reception side terminal number and the transmission side terminal number is smaller than a sum total of the amounts of information items of wireless terminals in which the wireless terminals 10, 11, . . . , and 19 are able to communicate with its own terminal.

Thus, a load (for example, a processing load needed to select either the direct communication or the indirect communication and a communication load needed to communicate the information) can be reduced. As described above, according to the above configuration, the communication efficiency can be increased while avoiding an excessive increase in a load.

Further, according to the above configuration, communication for its own terminal is selected based on the transmission side terminal number for the neighboring transmitting terminal as well as the transmission side terminal number for its own terminal. Thus, when the hidden terminal number for its own terminal is larger than the hidden terminal number for the neighboring transmitting terminal, the indirect communication may be selected for its own terminal. Accordingly, it is possible to prevent the number of the transmitting terminals 11, 12, . . . , and 19 executing the indirect communication from wastefully increasing while suppressing the occurrence of a collision of radio signals in the receiving terminal 10.

Further, the wireless communication system 1 according to the first embodiment calculates the hidden terminal number parameter for the target transmitting terminal and the hidden terminal number parameter for the neighboring transmitting terminal. Further, when the hidden terminal number parameter for the target transmitting terminal is larger than the hidden terminal number parameter for the neighboring transmitting terminal, the wireless communication system 1 selects the indirect communication for the target transmitting terminal.

Accordingly, it is possible to prevent the number of the transmitting terminals 11, 12, . . . , and 19 executing the indirect communication from wastefully increasing while suppressing the occurrence of a collision of radio signals in the receiving terminal 10.

In addition, the wireless communication system 1 according to the first embodiment calculates the hidden terminal number parameters for the neighboring transmitting terminals. Further, when the hidden terminal number parameter for the target transmitting terminal is larger than the maximum value of the hidden terminal number parameters for the neighboring transmitting terminals, the wireless communication system 1 selects the indirect communication for the target transmitting terminal.

Thus, it is possible to more reliably prevent the transmitting terminals 11, 12, . . . , and 19 executing the indirect communication from wastefully increasing while suppressing the occurrence of a collision of radio signal in the receiving terminal 10.

Further, when the hidden terminal number parameter for the target transmitting terminal is equal to or greater than a certain first threshold value, the wireless communication system 1 according to the first embodiment selects the indirect communication for the target transmitting terminal.

Thus, it is possible to more reliably prevent the occurrence of a collision of radio signal in the receiving terminal 10.

Note that, in the wireless communication system 1, each of the transmitting terminals 11, 12, . . . , and 19 may transmit information representing communication (the direct communication or the indirect communication) set to be executed by its own terminal and notify a neighboring wireless terminal of the information.

Further, the wireless communication system 1 according to the first embodiment is configured such that all of the transmitting terminals 11, 12, . . . , and 19 set to execute the direct communication perform communication selection based on the hidden terminal number parameter. However, the wireless communication system 1 may be configured such that only some of the transmitting terminals 11, 12, . . . , and 19 set to execute the direct communication perform communication selection. For example, the wireless communication system 1 may be configured such that one of the transmitting terminals 11, 12, . . . , and 19 set to execute the direct communication is specified as the target transmitting terminal, and only the specified target transmitting terminal performs the communication selection.

Note that, in the wireless communication system 1, each of the wireless terminals 10, 11, . . . , and 19 may omit the sensor 109. For example, each of the wireless terminal 10, 11, . . . , and 19 may be configured to be connected to a device including a sensor and to receive the physical quantity information from the device.

Note that, the wireless communication system 1 may use a value obtained by adding the number (that is, "1") of the receiving terminals 10 to the number of the response signals received by the transmitting terminal as the transmission side terminal number. In this case, the wireless communication system 1 preferably calculates a value obtained by subtracting the transmission side terminal number from the reception side terminal number as the hidden terminal number parameter.

Further, the wireless communication system 1 may be configured such that a path is set according to a known method, and then the set path is changed by selecting communication for the direct transmitting terminals 11, 12, ..., and 19. In this case, the wireless communication system 1 preferably obtains the reception side terminal number based on the path information representing the set path instead of obtaining the reception side terminal number based on the response signal to the response request signal.

Alternatively, the wireless communication system 1 may set the first threshold value based on the reception side terminal number. For example, the wireless communication system 1 may set a value obtained by multiplying the reception side terminal number by a certain coefficient as the first threshold value. Further, the wireless communication system 1 may be configured such that the receiving terminal 10 determines the first threshold value, and the receiving terminal 10 notifies the transmitting terminals 11, 12, ..., and 19 of the first threshold value.

Further, in the wireless communication system 1, the receiving terminal 10 may be configured to end the process illustrated in FIG. 4 when the currently obtained reception side terminal number is equal to the previously obtained reception side terminal number.

Further, the wireless communication system 1 may omit the process of step S209 in the process illustrated in FIG. 5. In other words, the wireless communication system 1 may be configured to select the indirect communication even when the hidden terminal number parameter for its own terminal is smaller than the first threshold value and the hidden terminal number parameter for its own terminal is larger than the maximum value of the hidden terminal number parameters for the neighboring transmitting terminals.

Further, the wireless communication system 1 may be configured to select the indirect communication when the hidden terminal number parameter for its own terminal is larger than at least one of the hidden terminal number parameters for the neighboring transmitting terminals.

First Modified Example of First Embodiment

Next, a wireless communication system according to a first modified example of the first embodiment of the present invention will be described. The wireless communication system according to the first modified example is different from the wireless communication system according to the first embodiment in that the indirect communication is selected only when there is any other transmitting terminal that is able to communicate with its own terminal. The following description will proceed focusing on the different point. Note that, in the description of the first modified example, a component which is denoted by the same reference numeral as the reference numeral used in the first embodiment is the same component or almost the same component as in the first embodiment.

(Function)

Figure 6:
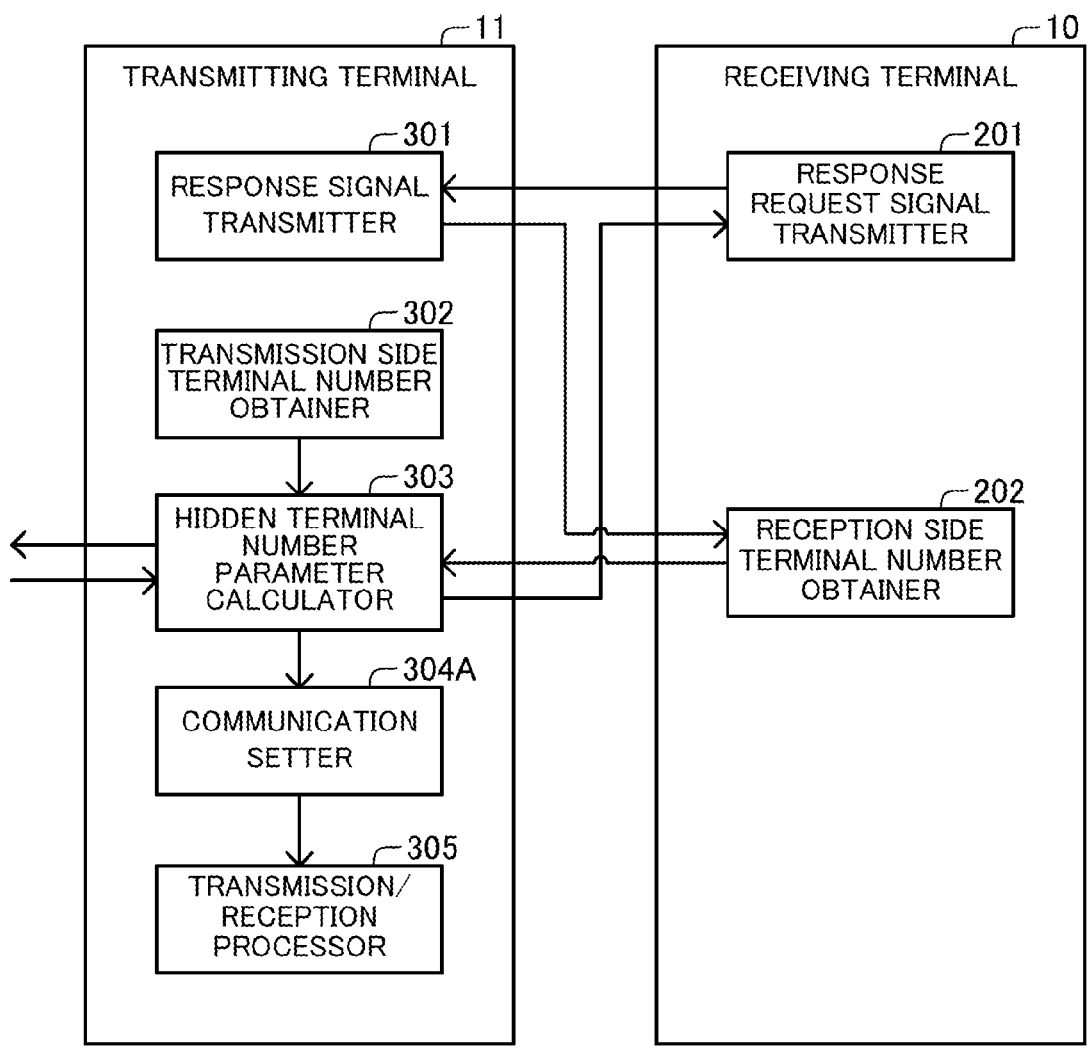
FIG. 6 is a diagram illustrating functions of a transmitting terminal and a receiving terminal according to a first modified example of the first embodiment.

As illustrated in FIG. 6, as a function of the transmitting terminal 11 according to the first modified example, a communication setter 304A is provided instead of the communication setter 304.

The communication setter 304A according to the first modified example executes the communication selection process, the path setting process, and the transmission power setting process when its own terminal 11 is the direct transmitting terminal, similarly to the communication setter 304 according to the first embodiment.

In the communication selection process according to the first modified example, when a second condition is not satisfied although the first condition for selecting the indirect communication in the communication selection process according to the first embodiment is satisfied, the indirect communication is not selected.

The second condition is a condition in which there is any other transmitting terminal (that is, the other transmitting terminal 12, 13, ..., or 19) that is able to communicate with its own terminal 11 under the assumption that transmission power (transmission power of a radio signal) used for its own terminal 11 to transmit a signal including the physical quantity information is set to the second transmission power.

For example, in the communication selection process, propagation loss (that is, propagation loss between its own terminal 11 and a j-th (here, j is an integer) neighboring transmitting terminal) $L_j$ is estimated for each of the neighboring transmitting terminals 12, 13, ..., and 19 based on the following Expression 3:

$$L_j = P_{tx\_j} - P_{rx\_j} \qquad \text{[Expression 3]}$$

Here, $P_{tx\_j}$ is transmission power of a radio signal to be transmitted by the j-th neighboring transmitting terminal in the j-th neighboring transmitting terminal. Further, $P_{rx\_j}$ is reception power of a radio signal transmitted from the j-th neighboring transmitting terminal in its own terminal 11.

In this example, notification of the transmission power $P_{tx\_j}$ in the j-th neighboring transmitting terminal is given from the j-th neighboring transmitting terminal to its own terminal 11. Thus, in the communication selection process, a value notified from the j-th neighboring transmitting terminal is obtained as the transmission power $P_{tx\_j}$ in the j-th neighboring transmitting terminal. Further, in the communication selection process, reception power of the parameter signal that is transmitted from the j-th neighboring transmitting terminal and received by its own terminal 11 is obtained as the reception power $P_{rx\_j}$ in its own terminal 11.

Further, in the communication selection process, it is determined whether or not a value (that is, a minimum value of an estimated reception power) obtained by subtracting the maximum value of the propagation loss $L_j$ estimated for the neighboring transmitting terminals 12, 13, ..., and 19 from the second transmission power is larger than a minimum reception power $P_{min}$.

In the communication selection process, when the minimum value of the estimated reception power is larger than the minimum reception power, the second condition is determined to be satisfied. However, in the communication selection process, when the minimum value of the estimated reception power is equal or smaller than the minimum reception power, the second condition is determined not to be satisfied.

(Operation)

An operation of the transmitting terminal 11 according to the first modified example will be described with reference to FIG. 7.

Figure 7:
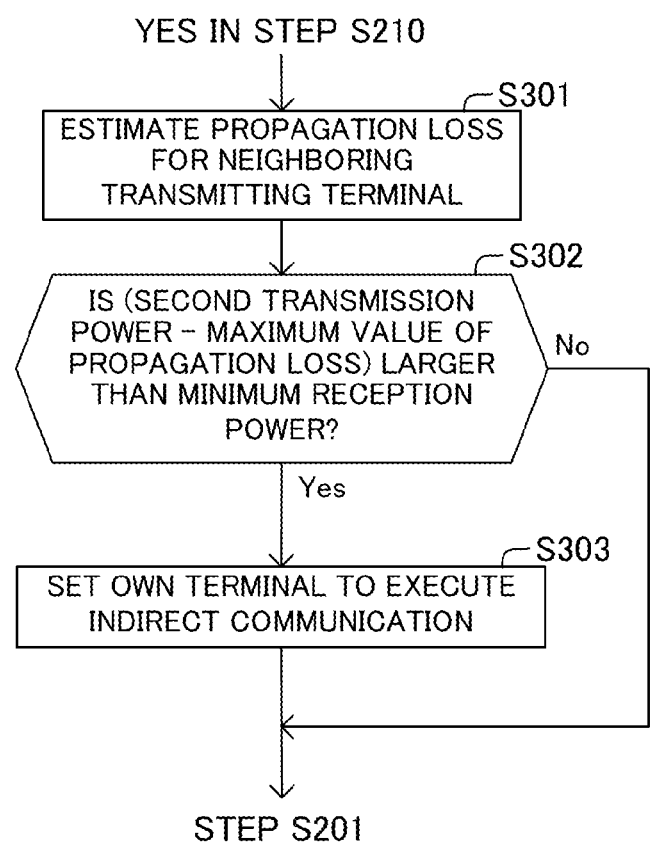
FIG. 7 is a flowchart illustrating a process executed by the transmitting terminal according to the first modified example of the first embodiment.

The transmitting terminal 11 is configured to execute the process in which step S211 of the process illustrated in FIG. 5 according to the first embodiment is replaced with steps S301 to S303 as illustrated in FIG. 7.

For example, when "Yes" is determined in step S210 in FIG. 5, the transmitting terminal 11 estimates the propagation loss for each of the neighboring transmitting terminals 12, 13, ..., and 19 (step S301 of FIG. 7). Then, the transmitting terminal 11 determines a value (that is, a minimum value of an estimated reception power) obtained by subtracting the maximum value of the propagation loss estimated for the neighboring transmitting terminals 12, 13, ..., and 19 from the second transmission power is larger than a minimum reception power (step S302 of FIG. 7).

When the minimum value of the estimated reception power is larger than the minimum reception power, the transmitting terminal 11 determines "Yes," and sets its own terminal 11 to execute the indirect communication (step S303 of FIG. 7). However, when the minimum value of the estimated reception power is equal to or smaller than the minimum reception power, the transmitting terminal 11 determines "No," and causes the process to return to step S201 without executing the process of step S303. In other words, in this case, the transmitting terminal 11 maintains the state in which its own terminal 11 is set to execute the direct communication.

As described above, the wireless communication system 1 according to the first modified example can include the same effects as in the wireless communication system 1 according to the first embodiment.

Further, in the wireless communication system 1 according to the first modified example, it is determined whether or not there is any other wireless terminal (that is, the other wireless terminals 11, 12, . . . , and 19), which is able to communicate with the transmitting terminals 11, 12, . . . , and 19, other than the receiving terminal 10 under the assumption that transmission power of a radio signal used for the transmitting terminals 11, 12, . . . , and 19 to transmit the physical quantity information is set to the second transmission power. Then, in the wireless communication system 1, when it is determined that there is no wireless terminal, the direct communication is selected for the transmitting terminals 11, 12, . . . , and 19.

Accordingly, the situation in which it is difficult for the transmitting terminals 11, 12, . . . , and 19 to transfer information to the receiving terminal 10 can be prevented.

The Second Modified Example of the First Embodiment

Next, a wireless communication system according to a second modified example of the first embodiment of the present invention will be described. The wireless communication system according to the second modified example is different from the wireless communication system according to the first embodiment in that when the indirect communication is selected, transmission power is set such that its own terminal is able to communicate with another transmitting terminal. The following description will proceed focusing on the different point. Note that, in the second modified example, a component which is denoted by the same reference numeral as the reference numeral used in the first embodiment is the same component or almost the same component as in the first embodiment.

(Function)

Figure 8:
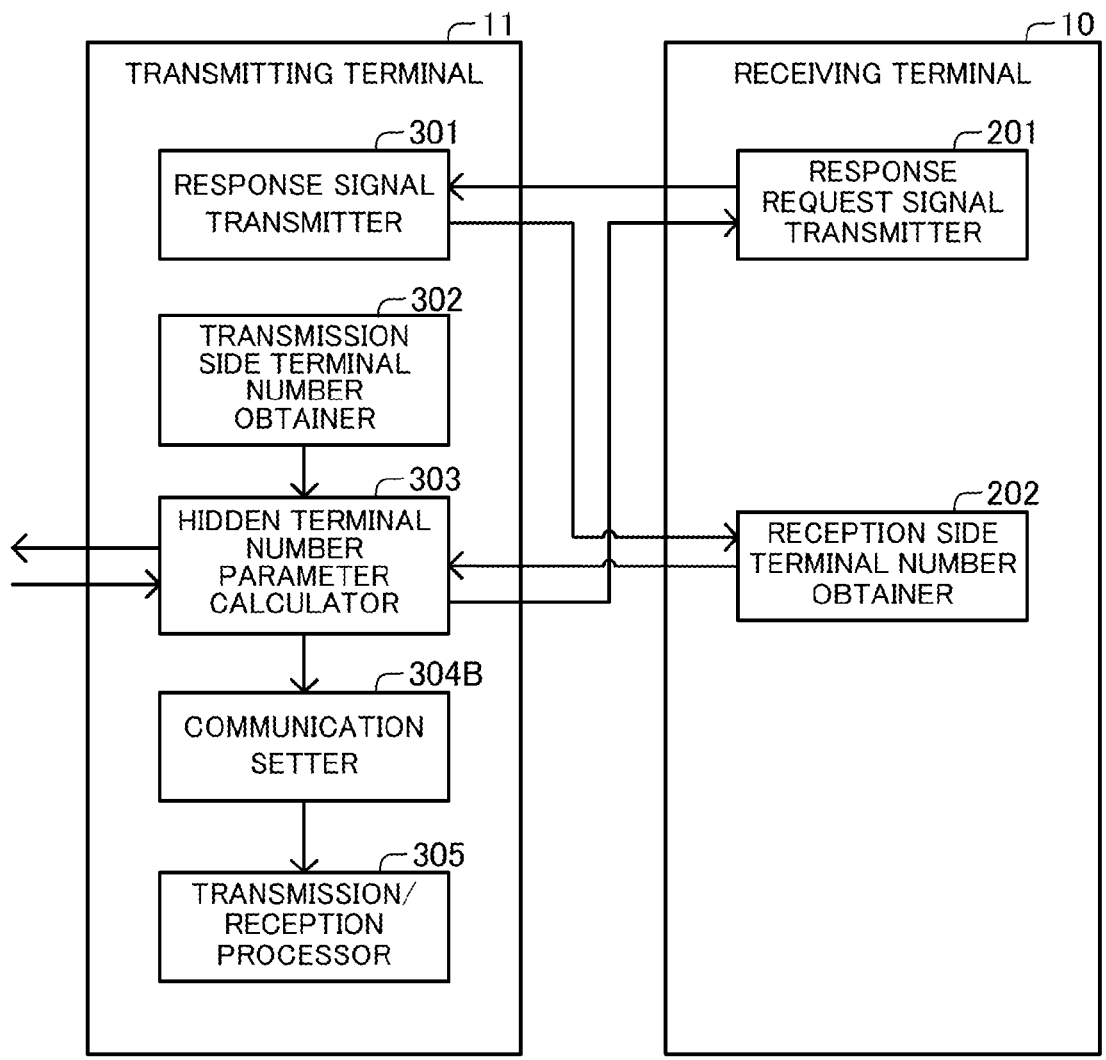
FIG. 8 is a diagram illustrating functions of a transmitting terminal and a receiving terminal according to a second modified example of the first embodiment.

As illustrated in FIG. 8, as a function of the transmitting terminal 11 according to the second modified example, a communication setter 304B is provided instead of the communication setter 304.

The communication setter 304B according to the second modified example executes the communication selection process, the path setting process, and the transmission power setting process when its own terminal 11 is the direct transmitting terminal, similarly to the communication setter 304 according to the first embodiment.

In the transmission power setting process according to the second modified example, the second transmission power is determined to be smaller than the first transmission power so that its own terminal 11 is able to communicate with at least one of the wireless terminals 12, 13, . . . , and 19 (the neighboring transmitting terminals) other than the receiving terminal 10.

For example, in the transmission power setting process, propagation loss (that is, propagation loss between its own terminal 11 and a j-th (here, j is an integer) neighboring transmitting terminal) $L_j$ for each of the neighboring transmitting terminals 12, 13, . . . , and 19 is estimated based on the following Expression 4:

$$L_j = P_{tx\_j} - P_{rx\_j}$$ [Expression 4]

Here, $P_{tx\_j}$ is transmission power of a radio signal to be transmitted by the j-th neighboring transmitting terminal in the j-th neighboring transmitting terminal. $P_{rx\_j}$ is reception power of a radio signal transmitted by the j-th neighboring transmitting terminal in its own terminal 11.

In this example, notification of the transmission power $P_{tx\_j}$ in the j-th neighboring transmitting terminal is given from the j-th neighboring transmitting terminal to its own terminal 11. Thus, in the transmission power setting process, a value notified from the j-th neighboring transmitting terminal is obtained as the transmission power $P_{tx\_j}$ in the j-th neighboring transmitting terminal. Further, in the transmission power setting process, reception power of the parameter signal that is transmitted by the j-th neighboring transmitting terminal and received by its own terminal 11 is obtained as the reception power $P_{rx\_j}$ in its own terminal 11.

Then, in the transmission power setting process, a neighboring transmitting terminal that is smallest in the estimated propagation loss $L_j$ is specified as a target terminal. In the transmission power setting process, the second the transmission power $P_{tx}$ at which communication with the target terminal can be performed is determined based on Expression 5 substituting for Expression 1 and the propagation loss $L_{target}$ for the specified target terminal. Here, β is certain second surplus power including a positive value.

$$P_{tx} = P_{min} + L_{target} + \beta$$ [Expression 5]

Further, in the path setting process according to the second modified example, the indirect path setting request is transmitted to the target terminal so that the indirect path connecting its own terminal 11 indirectly with the receiving terminal 10 firstly through the specified target terminal is set.

Note that, the target terminal may be randomly selected from among the neighboring transmitting terminals. Alternatively, the target terminal may be selected from among the neighboring transmitting terminals in which the estimated propagation loss $L_j$ is equal to or less than certain threshold loss value.

Note that, when the determined second transmission power is higher than the first transmission power, the transmitting terminal 11 is preferably configured not to set its own terminal 11 to execute the indirect communication.

(Operation)

An operation of the transmitting terminal 11 according to the second modified example will be described with reference to FIG. 9.

Figure 9:
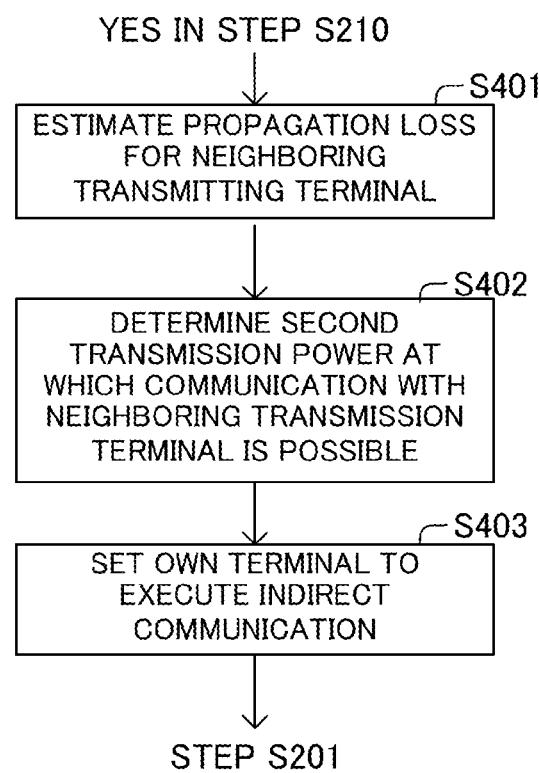
FIG. 9 is a flowchart illustrating a process executed by the transmitting terminal according to the second modified example of the first embodiment.

The transmitting terminal 11 is configured to execute the process in which step S211 in the process illustrated in FIG. 5 according to the first embodiment is replaced with steps S401 to S403 as illustrated in FIG. 9.

For example, when "Yes" is determined in step S210 of FIG. 5, the transmitting terminal 11 estimates the propagation loss for each of the neighboring transmitting terminals 12, 13, . . . , and 19 (step S401 of FIG. 9).

Then, the transmitting terminal 11 specifies a neighboring transmitting terminal that is smallest in the estimated propagation loss as the target terminal. Next, the transmitting terminal 11 determines the second transmission power at which communication with the neighboring transmitting terminal specified as the target terminal can be performed (step S402 of FIG. 9).

Then, the transmitting terminal 11 sets its own terminal 11 to execute the indirect communication (step S403 of FIG. 9). For example, the transmitting terminal 11 sets transmission power (transmission power of a radio signal) used for its own terminal 11 to transmit a signal including the physical quantity information to the determined second transmission power.

Further, the transmitting terminal 11 transmits the indirect path setting request to the target terminal so that the indirect path connecting its own terminal 11 indirectly with the receiving terminal 10 firstly through the specified target terminal is set. Thus, the indirect path is set.

Thereafter, the transmitting terminal 11 causes the process to return to step S201.

As described above, the wireless communication system 1 according to the second modified example can include the same effects as in the wireless communication system 1 according to the first embodiment.

Further, in the wireless communication system 1 according to the second modified example, power that is smaller than the first transmission power and causes the transmitting terminals 11, 12, . . . , and 19 to be able to communicate with at least one of the neighboring transmitting terminals 11, 12, . . . , and 19 is determined as the second transmission power.

Accordingly, the situation in which it is difficult for the transmitting terminals 11, 12, . . . , and 19 to transfer information to the receiving terminal 10 can be prevented.

Second Embodiment

Next, a wireless communication system according to a second embodiment of the present invention will be described. The wireless communication system according to the second embodiment is different from the wireless communication system according to the first embodiment in that a transmitting terminal set to execute the indirect communication is reset to execute the direct communication when a certain condition is satisfied. The following description will proceed focusing on the different point. Note that, in the description of the second embodiment, components denoted by the same reference numerals as in the first embodiment are the same components or approximately the same component as in the first embodiment.

(Function)

Figure 10:
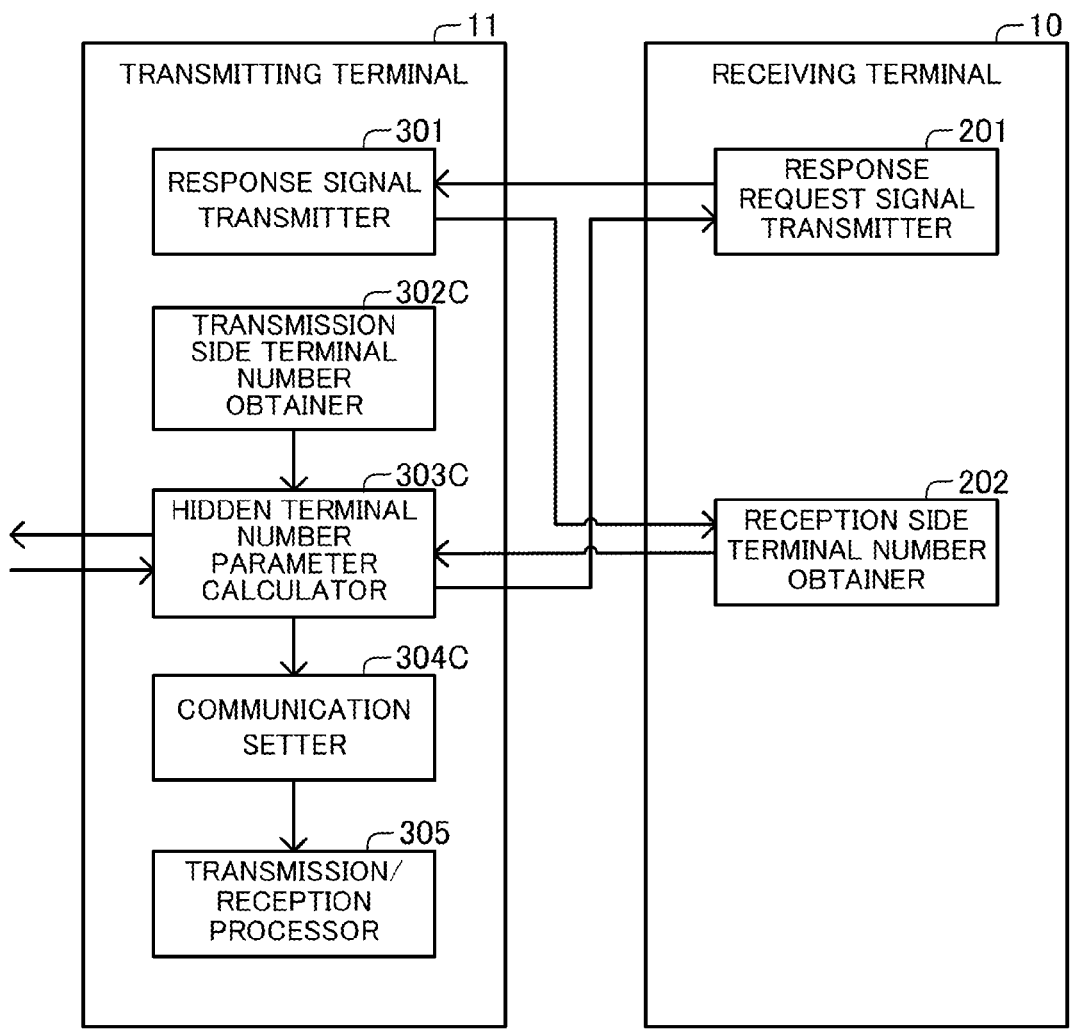
FIG. 10 is a diagram illustrating functions of a transmitting terminal and a receiving terminal according to a second embodiment.

As illustrated in FIG. 10, as a function of the transmitting terminal 11 according to the second embodiment, a transmission side terminal number obtainer 302C is provided instead of the transmission side terminal number obtainer 302. Further, as a function of the transmitting terminal 11, a hidden terminal number parameter calculator 303C is provided instead of the hidden terminal number parameter calculator 303. In addition, as a function of the transmitting terminal 11, a communication setter 304C is provided instead of the communication setter 304.

The transmission side terminal number obtainer 302C obtains the transmission side terminal number even when its own terminal 11 is the indirect transmitting terminal in addition to the function of the transmission side terminal number obtainer 302. The indirect transmitting terminal is a transmitting terminal set to execute the indirect communication.

Similarly, the hidden terminal number parameter calculator 303C calculates the hidden terminal number parameter even when its own terminal 11 is the indirect transmitting terminal in addition to the function of the hidden terminal number parameter calculator 303.

Further, the communication setter 304C according to the second embodiment executes the return process when its own terminal 11 is the indirect transmitting terminal in addition to the function of the communication setter 304.

The return process is a process of setting its own terminal 11 to execute the direct communication when the hidden terminal number parameter for its own terminal 11 is smaller than a certain second threshold value.

(Operation)

An operation of the transmitting terminal 11 according to the second embodiment will be described with reference to FIG. 11.

Figure 11:
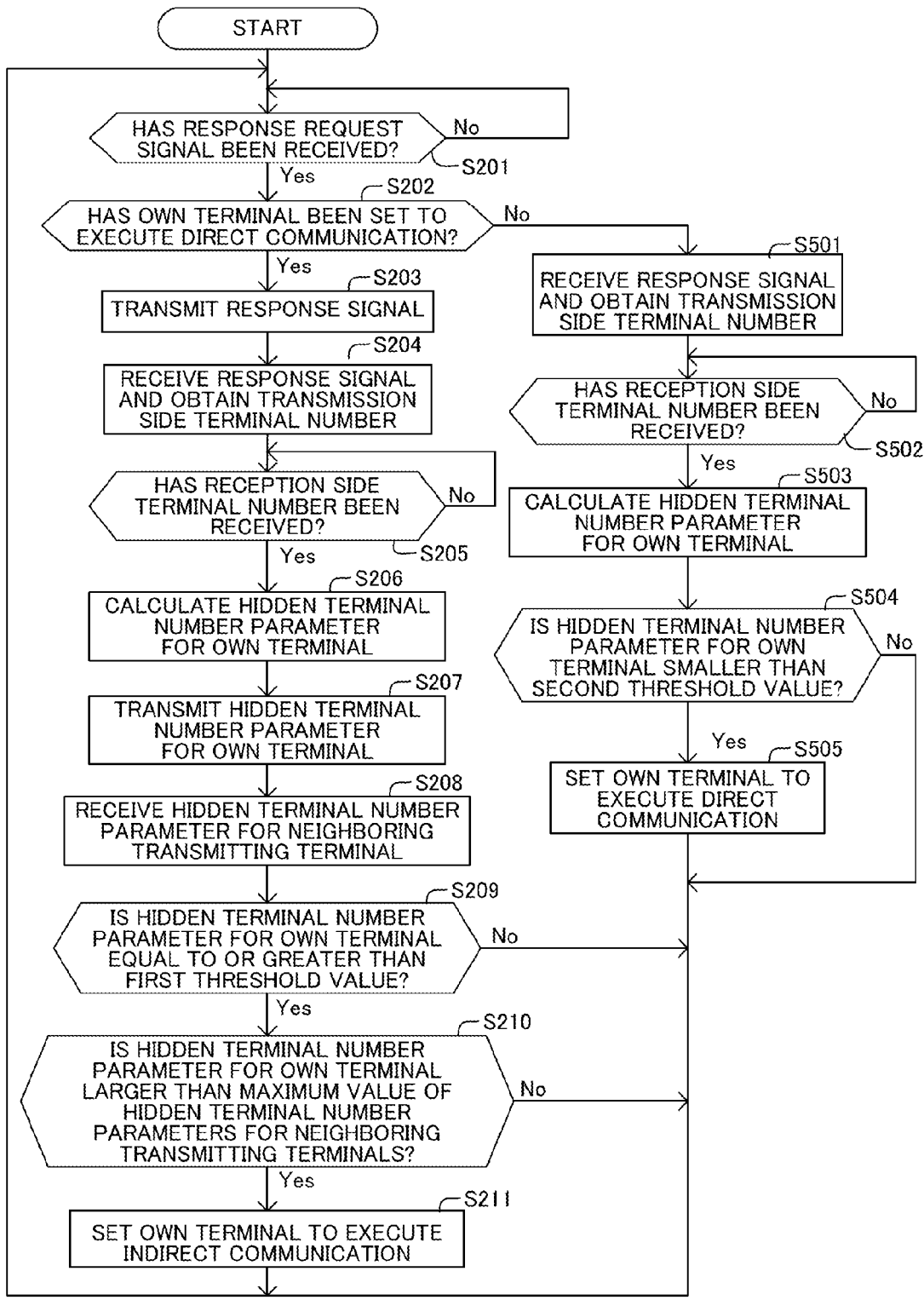
FIG. 11 is a flowchart illustrating a process executed by the transmitting terminal according to the second embodiment.

The transmitting terminal 11 is configured to execute a process in which the process of steps S501 to S505 is added after "No" is determined in step S202 in the process of FIG. 5 according to the first embodiment as illustrated in FIG. 11.

For example, when "No" is determined in step S202 of FIG. 11, the transmitting terminal 11 obtains the number of response signals received within a period of time until a certain fifth standby period of time elapses after the response request signal is received in step S201 of FIG. 11 as the transmission side terminal number (step S501 of FIG. 11). In other words, the transmitting terminal 11 obtains the transmission side terminal number which is the number of transmitting terminals (in this example, the transmitting terminals 12, 13, . . . , and 19) with which its own terminal 11 is able to communicate directly.

Next, the transmitting terminal 11 is on standby until the reception side terminal number signal is received (step S502 of FIG. 11). Then, when the reception side terminal number signal transmitted from the receiving terminal 10 is received, the transmitting terminal 11 determines "Yes," and calculates the hidden terminal number parameter for its own terminal 11 (step S503 of FIG. 11).

Then, the transmitting terminal 11 determines whether or not the hidden terminal number parameter for its own terminal 11 is smaller than a certain second threshold value (step S504 of FIG. 11). In this example, the second threshold value is set to "1." The second threshold value is preferably a value equal to or less than the first threshold value. Note that, the second threshold value may be a value which is determined by the receiving terminal 10 and then transmitted from the receiving terminal 10.

Then, when the hidden terminal number parameter is smaller than the second threshold value, the transmitting terminal 11 determines "Yes," and sets its own terminal 11 to execute the direct communication (step S505 of FIG. 11).

However, when the hidden terminal number parameter is equal to or greater than the second threshold value, the transmitting terminal 11 determines "No," and causes the process to return to step S201 without executing the process of step S505. In other words, in this case, the transmitting terminal 11 maintains the state in which its own terminal 11 is set to execute the indirect communication.

As described above, the wireless communication system 1 according to the second embodiment can include the same effects as in the wireless communication system 1 according to the first embodiment.

Further, the wireless communication system 1 according to the second embodiment calculates the hidden terminal number parameter for each of the indirect transmitting terminals 11, 12, . . . , and 19. Further, the wireless communication system 1 resets the indirect transmitting terminal in which the hidden terminal number parameter is smaller than the second threshold value to execute the direct communication.

Meanwhile, when the hidden terminal number parameters for the indirect transmitting terminals 11, 12, . . . , and 19 are sufficiently small, a possibility that the hidden terminal numbers for the other transmitting terminals 11, 12, . . . , and 19 will increase is sufficiently low even when the indirect transmitting terminal is set to execute the direct communication. Accordingly, according to the above configuration, it is possible to prevent the number of the transmitting terminals 11, 12, . . . , and 19 executing the indirect communication from wastefully increasing while suppressing the occurrence of a collision of radio signals in the receiving terminal 10.

Third Embodiment

Next, a wireless communication system according to a third embodiment of the present invention will be described. The wireless communication system according to the third embodiment is different from the wireless communication system according to the first embodiment in that a transmitting terminal set to execute the indirect communication is reset to execute the direct communication when a certain condition is satisfied. The following description will proceed focusing on the different point. Note that, in the description of the third embodiment, a component which is denoted by the same reference numeral as the reference numeral used in the first embodiment is the same component or almost the same component as in the first embodiment.

(Function)

Figure 12:
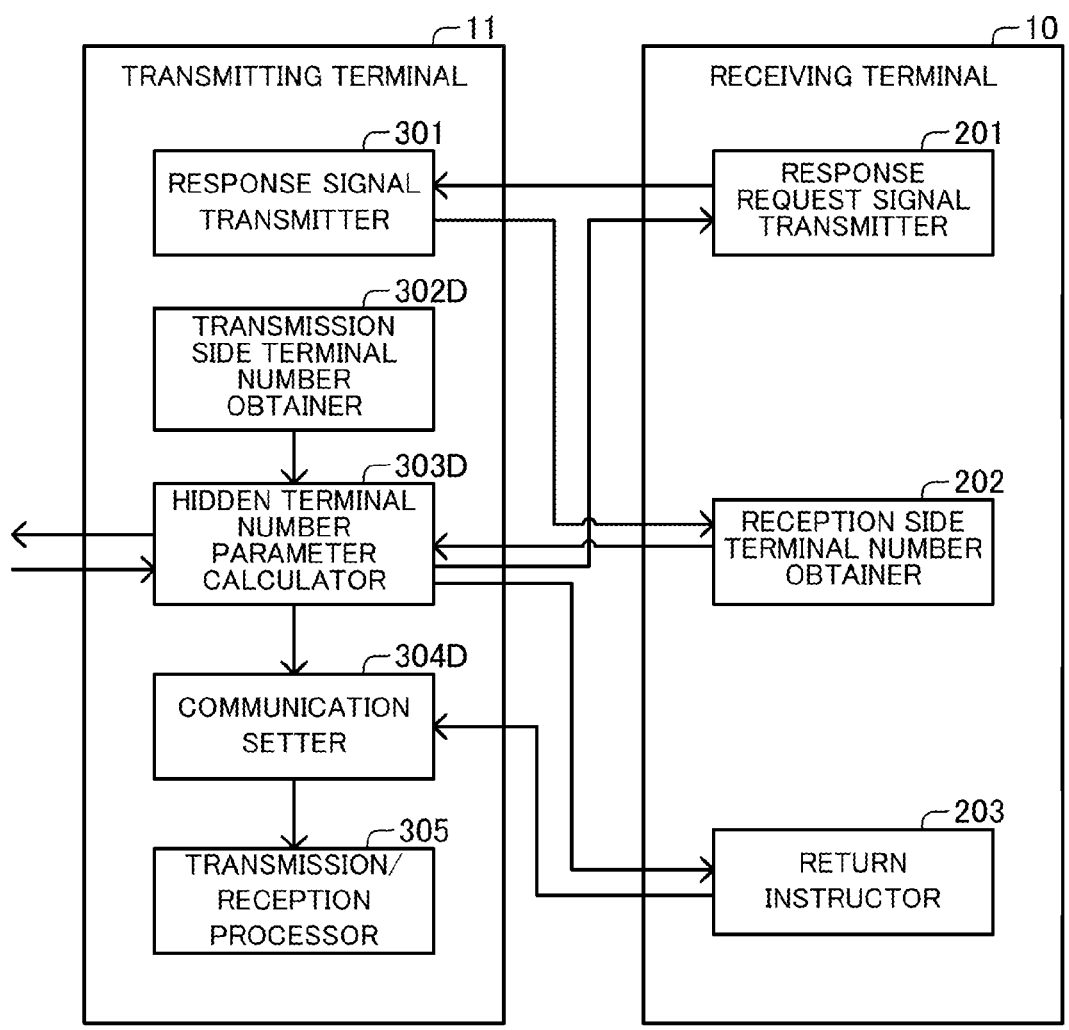
FIG. 12 is a diagram illustrating functions of a transmitting terminal and a receiving terminal according to a third embodiment.

As illustrated in FIG. 12, as a function of the receiving terminal 10 according to the third embodiment, a return instructor (a part of a setter) 203 is provided in addition to the functions of the receiving terminal 10 according to the first embodiment.

The return instructor 203 transmits a certain return notification signal when the maximum value of the hidden terminal number parameters (that is, the hidden terminal number parameters for the respective direct transmitting terminals) represented by the parameter signals transmitted from the direct transmitting terminals 11, 12, . . . , and 19 is smaller than a certain second target value. The second target value is a value smaller than the first target value. In this example, the second target value is a value obtained by subtracting a certain reserved amount from the first target value.

In this example, the return notification signal is a signal (that is, a broadcast signal) in which all wireless terminals are set as the destination. When the return notification signal is received, each of the transmitting terminals 11, 12, . . . , and 19 does not transfer the return notification signal to the other wireless terminals 10, 11, . . . , and 19.

Further, as a function of the transmitting terminal 11 according to the third embodiment, a transmission side terminal number obtainer 302D is provided instead of the transmission side terminal number obtainer 302. Further, as a function of the transmitting terminal 11, a hidden terminal number parameter calculator 303D is provided instead of the hidden terminal number parameter calculator 303. In addition, as a function of the transmitting terminal 11, a communication setter 304D is provided instead of the communication setter 304.

The transmission side terminal number obtainer 302D obtains the transmission side terminal number even when its own terminal 11 is the indirect transmitting terminal in addition to the function of the transmission side terminal number obtainer 302.

Similarly, the hidden terminal number parameter calculator 303D calculates the hidden terminal number parameter even when its own terminal 11 is the indirect transmitting terminal in addition to the function of the hidden terminal number parameter calculator 303.

Further, the hidden terminal number parameter calculator 303D transmits the parameter signal representing the calculated hidden terminal number parameter when the return notification signal transmitted from the receiving terminal 10 is received. Further, when the return notification signal transmitted by the receiving terminal 10 is received, the hidden terminal number parameter calculator 303D receives the parameter signal transmitted from the neighboring transmitting terminals 12, 13, . . . , and 19 serving as the indirect transmitting terminal.

Further, the communication setter 304D executes a return process when the return notification signal is received in the case in which its own terminal 11 is the indirect transmitting terminal in addition to the function of the communication setter 304.

The return process is a process of setting its own terminal 11 to execute the direct communication when both a third condition and a fourth condition are satisfied. In this example, the return process is a process of maintaining the state in which its own terminal 11 is set to execute the indirect communication when at least one of the third and fourth conditions is not satisfied.

The third condition is a condition in which the hidden terminal number parameter for its own terminal 11 is smaller than a certain second threshold value. Note that, the second threshold value is preferably a value equal to or smaller than the first threshold value. Further, the second threshold value may be a value that is determined by the receiving terminal 10 and then transmitted by the receiving terminal 10.

The fourth condition is a condition in which the hidden terminal number parameter for its own terminal 11 is smaller than a minimum value of the hidden terminal number parameters represented by the parameter signals transmitted from the neighboring transmitting terminals 12, 13, . . . , and 19.

(Operation)

Next, an operation of the wireless communication system 1 will be described with reference to FIGS. 13 and 14.

Figure 13:
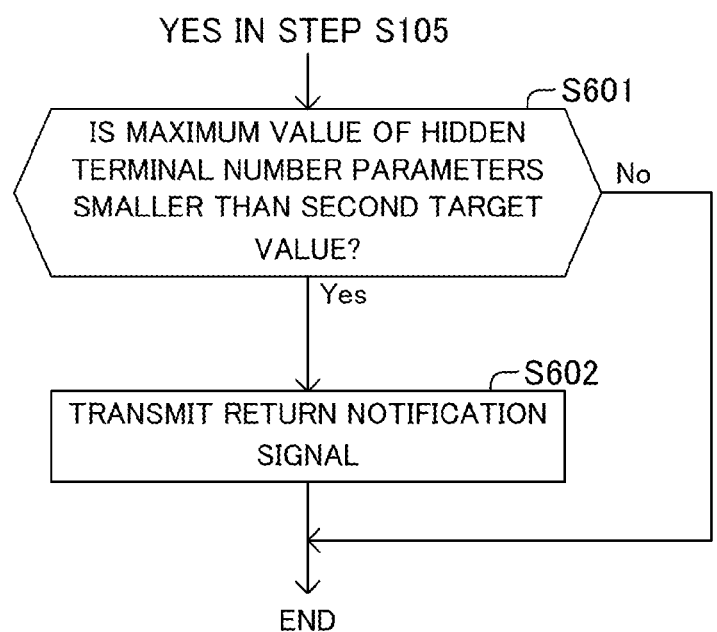
FIG. 13 is a flowchart illustrating a process executed by the receiving terminal according to the third embodiment.

The receiving terminal 10 is configured to execute a process in which the process of steps S601 and S602 is added after "Yes" is determined in step S105 in the process of FIG. 4 according to the first embodiment as illustrated in FIG. 13.

Figure 14:
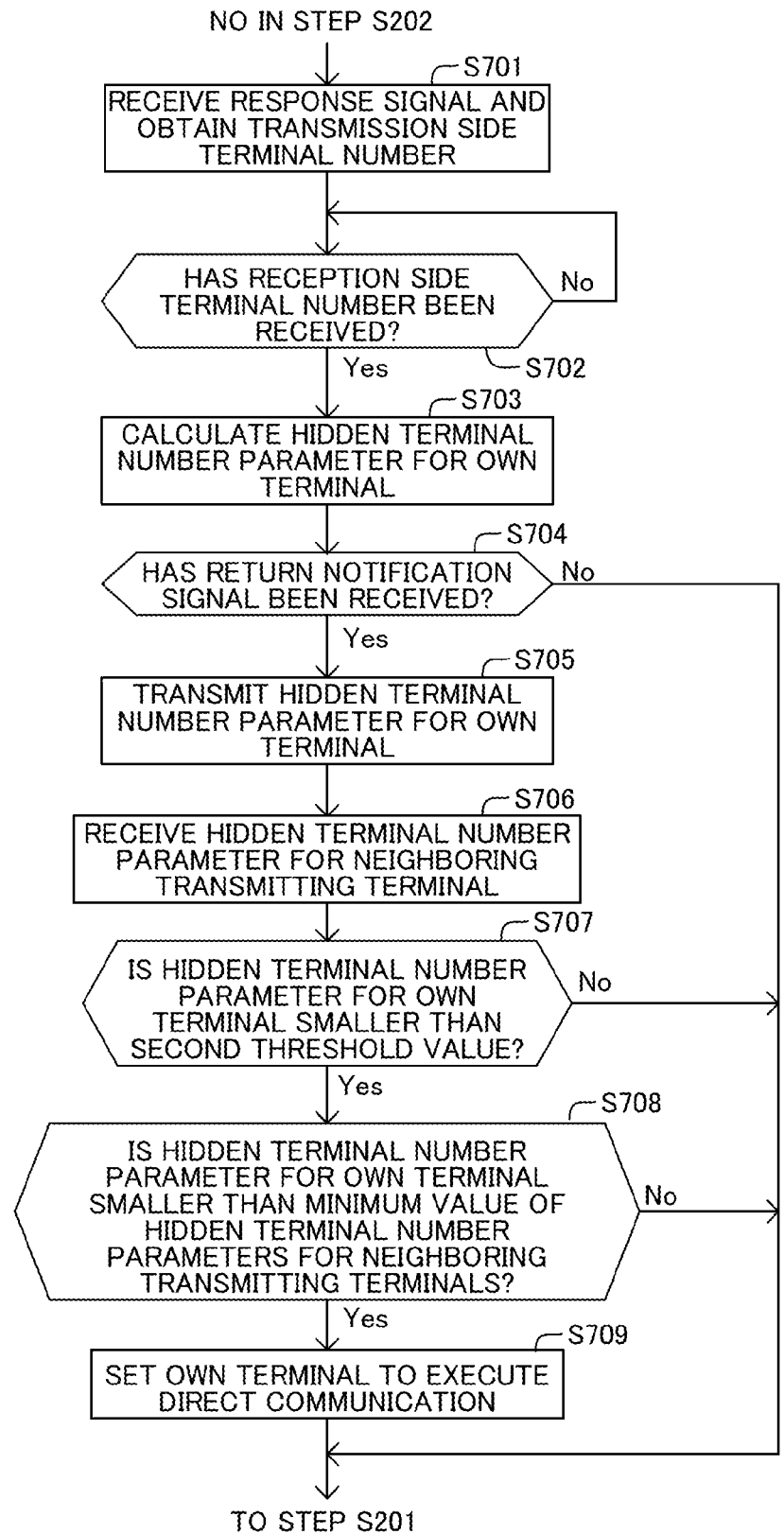
FIG. 14 is a flowchart illustrating a part of a process executed by the transmitting terminal according to the third embodiment.

Further, the transmitting terminal 11 is configured to execute a process in which the process of steps S701 to S709 is added before step S201 after "No" is determined in step S202 in the process of FIG. 5 according to the first embodiment as illustrated in FIG. 14.

For example, when "Yes" is determined in step S105 of FIG. 13, the receiving terminal 10 determines whether or not the maximum value of the hidden terminal number parameters represented by the parameter signals received in step S104 is smaller than a certain second target value (step S601 of FIG. 13). Note that, the hidden terminal number parameters are the hidden terminal number parameters for the direct transmitting terminals 11, 12, . . . , and 19.

Here, an example in which the maximum value of the hidden terminal number parameters is smaller than the second target value is assumed. In this case, the receiving terminal 10 determines "Yes," and transmits the return notification signal (step S602 of FIG. 13). Then, the receiving terminal 10 ends the process illustrated in FIG. 13. Note that, when the maximum value of the hidden terminal number parameter is equal to or greater than the second target value, the receiving terminal 10 determines "No," and ends the process illustrated in FIG. 13 without transmitting the return notification signal.

However, when "No" is determined in step S202 of FIG. 5, the transmitting terminal 11 obtains the number of response signals received within a period of time until a certain fifth standby period of time elapses after the response request signal is received in step S201 of FIG. 5 as the transmission side terminal number (step S701 of FIG. 14). In other words, the transmitting terminal 11 obtains the transmission side terminal number which is the number of transmitting terminals (in this example, the transmitting terminals 12, 13, . . . , and 19) with which its own terminal 11 is able to communicate directly.

Next, the transmitting terminal 11 is on standby until the reception side terminal number signal is received (step S702 of FIG. 14). Then, when the reception side terminal number signal transmitted from the receiving terminal 10 is received, the transmitting terminal 11 determines "Yes," and calculates the hidden terminal number parameter for its own terminal 11 (step S703 of FIG. 14).

Then, the transmitting terminal 11 determines whether or not the return notification signal has been received within a period of time until a certain sixth standby period of time elapses after the reception side terminal number is received in step S702 (step S704 of FIG. 14). According to the above assumption, since the return notification signal has been received, the transmitting terminal 11 determines "Yes," and transmits the parameter signal representing the hidden terminal number parameter for its own terminal 11 (step S705 of FIG. 14).

Then, the transmitting terminal 11 receives the parameter signals transmitted from the other transmitting terminals (the neighboring transmitting terminal) 12, 13, . . . , and 19 within a period of time until a certain seventh standby period of time elapses after the parameter signal is transmitted (step S706 of FIG. 14).

Then, the transmitting terminal 11 determines whether or not the hidden terminal number parameter for its own terminal 11 is smaller than a certain second threshold value (step S707 of FIG. 14). Then, when the hidden terminal number parameter is smaller than the second threshold value, the transmitting terminal 11 determines "Yes," and causes the process to proceed to step S708.

Next, the transmitting terminal 11 determines whether or not the hidden terminal number parameter for its own terminal 11 is smaller than the minimum value of the hidden terminal number parameters represented by the parameter signals transmitted from the neighboring transmitting terminals 12, 13, . . . , and 19 (step S708 of FIG. 14).

When the hidden terminal number parameter for its own terminal 11 is smaller than the minimum value of the hidden terminal number parameters for the neighboring transmitting terminals 12, 13, . . . , and 19, the transmitting terminal 11 determines "Yes," and sets its own terminal 11 to execute the direct communication (step S709 of FIG. 14). Thereafter, the transmitting terminal 11 causes the process to return to step S201.

Note that, when the return notification signal has not been received within a period of time until the sixth standby period of time elapses after the reception side terminal number is received, the transmitting terminal 11 determines "No" in step S704 of FIG. 14. In this case, the transmitting terminal 11 causes the process to return to step S201 without executing the process of steps S705 to S709. In other words, in this case, the transmitting terminal 11 maintains the state in which its own terminal 11 is set to execute the indirect communication.

When the process proceeds to step S707 of FIG. 14 and it is determined that the hidden terminal number parameter is equal to or greater than the second threshold value, the transmitting terminal 11 determines "No," and causes the process to return to step S201 without executing the process of steps S708 and S709. In other words, in this case, the transmitting terminal 11 maintains the state in which its own terminal 11 is set to execute the indirect communication.

Further, when the process proceeds to step S708 of FIG. 14 and it is determined that the hidden terminal number parameter for its own terminal 11 is equal to or greater than the minimum value of the hidden terminal number parameters for the neighboring transmitting terminals 12, 13, . . . , and 19, the transmitting terminal 11 determines "No," and causes the process to return to step S201 without executing the process of step S709. In other words, in this case, the transmitting terminal 11 maintains the state in which its own terminal 11 is set to execute the indirect communication.

As described above, the wireless communication system 1 according to the third embodiment has the same effects as the wireless communication system 1 according to the first embodiment.

Further, the wireless communication system 1 according to the third embodiment resets at least one of the indirect transmitting terminals 11, 12, . . . , and 19 to execute the direct communication when the maximum value of the hidden terminal number parameters for the direct transmitting terminals 11, 12, . . . , and 19 is smaller than a certain second target value.

Meanwhile, when the maximum value of the hidden terminal number parameters for the direct transmitting terminals 11, 12, . . . , and 19 is sufficiently small, the state in which the maximum value is relatively small can be maintained even when some of the indirect transmitting terminals 11, 12, . . . , and 19 execute the direct communication. Thus, according to the above configuration, it is possible to prevent the number of the transmitting terminals 11, 12, . . . , and 19 executing the indirect communication from wastefully increasing while suppressing the occurrence of a collision of radio signals in the receiving terminal 10.

The present invention has been described above with reference to the exemplary embodiments and examples, but the present invention is not limited to the exemplary embodiment. Further, various changes that a person having ordinary skill in the art can understand can be made on the configuration or details of the present invention within the scope of the present invention.

Note that, in the above embodiments, the functions of the wireless terminals 10, 11, . . . , and 19 are implemented by executing a program (software) through a processor, but may be implemented by hardware such as a circuit. Further, in the above embodiment, a program is stored in a memory, but a program may be stored in a computer readable recording medium. For example, a recording medium is a portable medium such as a flexible disk, an optical disc, a magneto optical disk, or a semiconductor memory.

Further, in the above embodiment, each of the transmitting terminals 11, 12, . . . , and 19 may be used as smart meter such that the transmitting terminal is attached to and combined with a measuring device such as various kinds of meters that are installed in houses or factories or various kinds of meters that measure a natural environment. As described above, the communication efficiency can be increased while avoiding an excessive increase in a load in the wireless communication system 1.

Further, an arbitrary combination of the above embodiments and the modified example may be employed as another modified examples of the above embodiments within the scope not departing from the gist of the present invention.

According to a wireless communication system of the present disclosure, it is possible to increase communication efficiency while avoiding an excessive increase in a load.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system comprising:
a plurality of wireless terminals constituting a wireless ad hoc network, the plurality of wireless terminals including a receiving terminal and a plurality of transmitting terminals, each of the plurality of transmitting terminals being configured to execute direct communication in which information is transmitted directly to the receiving terminal or indirect communication in which the information is transmitted indirectly to the receiving terminal through at least one other wireless terminal;
a reception side terminal number obtainer that obtains a reception side terminal number which is the number of the wireless terminals with which the receiving terminal is able to communicate directly;
a transmission side terminal number obtainer that obtains a transmission side terminal number which is the number of the wireless terminals with which the transmitting terminal is able to communicate directly for each of a target transmitting terminal which is one of the plurality of transmitting terminals and a neighboring transmitting terminal which is the transmitting terminal with which the target transmitting terminal is able to communicate directly; and
a setter that calculates a hidden terminal number parameter which is defined to increase as a hidden terminal number, which is the number of transmitting terminals with which the receiving terminal is able to communicate directly and with which a terminal of interest is unable to communicate directly, increases when the terminal of interest is the target transmitting terminal based on the transmission side terminal number for the target transmitting terminal and the reception side terminal number, calculates the hidden terminal number parameter when the terminal of interest is the neighboring transmitting terminal based on the transmission side terminal number for the neighboring transmitting terminal and the reception side terminal number, selects the indirect communication for the target transmitting terminal when the hidden terminal number parameter for the target transmitting terminal is larger than the hidden terminal number parameter for the neighboring transmitting terminal, and sets the target transmitting terminal to execute the selected communication.

2. The wireless communication system according to claim 1,
wherein the setter is configured to calculate the hidden terminal number parameter for each of the neighboring transmitting terminals when the terminal of interest is the neighboring transmitting terminal based on the transmission side terminal number for the neighboring transmitting terminal and the reception side terminal number, and select the indirect communication for the target transmitting terminal when the hidden terminal number parameter for the target transmitting terminal is larger than a maximum value of the hidden terminal number parameters for the neighboring transmitting terminals.

3. The wireless communication system according to claim 1,
wherein the setter is configured to select the indirect communication for the target transmitting terminal when the hidden terminal number parameter for the target transmitting terminal is equal to or greater than a certain threshold value.

4. The wireless communication system according to claim 1,
wherein the hidden terminal number parameter is a value obtained by subtracting a value which is obtained by adding "1" to the transmission side terminal number from the reception side terminal number.

5. The wireless communication system according to claim 1,
wherein the hidden terminal number parameter is a value obtained by dividing a value obtained by subtracting a value obtained by adding "1" to the transmission side terminal number from the reception side terminal number by the reception side terminal number.

6. The wireless communication system according to claim 1,
wherein the setter is configured to calculate, for each of indirect transmitting terminals set to execute the indirect communication among the plurality of transmitting terminals, the hidden terminal number parameter when the terminal of interest is the indirect transmitting terminal, and set the indirect transmitting terminal to execute the direct communication when the hidden terminal number parameter is smaller than a certain second threshold value.

7. The wireless communication system according to claim 1,
wherein the setter is configured to set at least one of indirect transmitting terminals set to execute the indirect communication among the plurality of transmitting terminals to execute the direct communication when a maximum value of the hidden terminal number parameters for direct transmitting terminals set to execute the direct communication among the plurality of transmitting terminals is smaller than a certain second target value.

8. The wireless communication system according to claim 1,
wherein the setter is configured to set transmission power of a radio signal used for the target transmitting terminal to transmit the information to first transmission power when the direct communication is selected for the target transmitting terminal, and set the transmission power of the radio signal to second transmission power which is lower than the first transmission power and causes reception power of the radio signal by the receiving terminal to be lower than a value previously set as a lower limit of a communicable range when the indirect communication is selected for the target transmitting terminal.

9. The wireless communication system according to claim 8,
wherein the setter is configured to determine whether a wireless terminal, other than the receiving terminal, which is able to communicate with the target transmitting terminal exists under the assumption that the transmission power of the radio signal used for the target transmitting terminal to transmit the information is set to the second transmission power, and select the direct communication for the target transmitting terminal when it is determined that the wireless terminal does not exist.

10. The wireless communication system according to claim 1,
wherein the setter is configured to set transmission power of a radio signal used for the target transmitting terminal to transmit the information to first transmission power when the direct communication is selected for the target transmitting terminal, and set the transmission power of the radio signal to second transmission power which is lower than the first transmission power and causes the target transmitting terminal to be able to communicate with at least one of the wireless terminals other than the receiving terminal when the indirect communication is selected for the target transmitting terminal.

11. The wireless communication system according to claim 1,
wherein the setter is configured to set a path connecting the transmitting terminal with the receiving terminal as a path through which the transmitting terminal transmits the information when the direct communication is selected for the transmitting terminal, and set a path connecting the transmitting terminal with the receiving terminal through at least one other wireless terminal as a path through which the transmitting terminal transmits the information when the indirect communication is selected for the transmitting terminal.

12. A wireless communication method applied to a wireless communication system including a plurality of wireless terminals constituting a wireless ad hoc network, the plurality of wireless terminals including a receiving terminal and a plurality of transmitting terminals, the wireless communication method comprising:
executing, by each of the plurality of transmitting terminals, direct communication in which information is transmitted directly to the receiving terminal or indirect communication in which the information is transmitted indirectly to the receiving terminal through at least one other wireless terminal;
obtaining a reception side terminal number which is the number of the wireless terminals with which the receiving terminal is able to communicate directly;
obtaining a transmission side terminal number which is the number of the wireless terminals with which the transmitting terminal is able to communicate directly for each of a target transmitting terminal which is one of the plurality of transmitting terminals and a neighboring transmitting terminal which is the transmitting terminal with which the target transmitting terminal is able to communicate directly;
calculating a hidden terminal number parameter which is defined to increase as a hidden terminal number, which is the number of transmitting terminals with which the receiving terminal is able to communicate directly and with which a terminal of interest is unable to communicate directly, increases when the terminal of interest is the target transmitting terminal based on the transmission side terminal number for the target transmitting terminal and the reception side terminal number;
calculating the hidden terminal number parameter when the terminal of interest is the neighboring transmitting terminal based on the transmission side terminal number for the neighboring transmitting terminal and the reception side terminal number;
selecting the indirect communication for the target transmitting terminal when the hidden terminal number parameter for the target transmitting terminal is larger than the hidden terminal number parameter for the neighboring transmitting terminal; and
setting the target transmitting terminal to execute the selected communication.

13. The wireless communication method according to claim 12,
wherein the setting includes calculating the hidden terminal number parameter for each of the neighboring transmitting terminals when the terminal of interest is the neighboring transmitting terminal based on the transmission side terminal number for the neighboring transmitting terminal and the reception side terminal number, and selecting the indirect communication for the target transmitting terminal when the hidden terminal number parameter for the target transmitting terminal is larger than a maximum value of the hidden terminal number parameters for the neighboring transmitting terminals.

14. The wireless communication method according to claim 12,
wherein the setting includes selecting the indirect communication for the target transmitting terminal when the hidden terminal number parameter for the target transmitting terminal is equal to or greater than a certain threshold value.

15. The wireless communication method according to claim 12,
wherein the hidden terminal number parameter is a value obtained by subtracting a value which is obtained by adding "1" to the transmission side terminal number from the reception side terminal number.

16. The wireless communication method according to claim 12,
wherein the hidden terminal number parameter is a value obtained by dividing a value obtained by subtracting a value obtained by adding "1" to the transmission side terminal number from the reception side terminal number by the reception side terminal number.

17. A transmitting terminal that is one of a plurality of transmitting terminals among a plurality of wireless terminals included in a wireless communication system including the plurality of wireless terminals constituting a wireless ad hoc network, the plurality of wireless terminals including a receiving terminal and the plurality of transmitting terminals, the transmitting terminal comprising:
a communication processor that executes direct communication in which information is transmitted directly to the receiving terminal or indirect communication in which the information is transmitted indirectly to the receiving terminal through at least one other wireless terminal;
a transmission side terminal number obtainer that obtains a transmission side terminal number which is the number of the wireless terminals with which the transmitting terminal as an own terminal is able to communicate directly;
a first receiver that receives a reception side terminal number, which is the number of the wireless terminals with which the receiving terminal is able to communicate directly, from the receiving terminal;
a transmitter that calculates a hidden terminal number parameter which is defined to increase as a hidden terminal number, which is the number of transmitting terminals with which the receiving terminal is able to communicate directly and with which a terminal of interest is unable to communicate directly, increases when the terminal of interest is the own terminal based on the received reception side terminal number and the obtained transmission side terminal number for the own terminal, and transmits the calculated hidden terminal number parameter;

a second receiver that receives the hidden terminal number parameter when the terminal of interest is a neighboring transmitting terminal, which is a transmitting terminal that is able to communicate directly with the own terminal, from the neighboring transmitting terminal; and a setter that selects one of the direct communication and the indirect communication based on the calculated hidden terminal number parameter for the own terminal and the received hidden terminal number parameter for the neighboring transmitting terminal, and sets the own terminal to execute the selected communication.

* * * * *